United States Patent
Hori et al.

(10) Patent No.: US 7,965,426 B2
(45) Date of Patent: Jun. 21, 2011

(54) IMAGE PROCESSING APPARATUS AND METHOD FOR PERFORMING GAMUT MAPPING VIA DEVICE-INDEPENDENT STANDARD COLOR SPACE

(75) Inventors: Ayumi Hori, Kawasaki (JP); Masao Kato, Kawasaki (JP); Tetsuya Suwa, Yokohama (JP); Manabu Yamazoe, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 11/462,652

(22) Filed: Aug. 4, 2006

(65) Prior Publication Data
US 2007/0035754 A1 Feb. 15, 2007

(30) Foreign Application Priority Data

Aug. 12, 2005 (JP) .................. 2005-234786
Jun. 1, 2006 (JP) .................. 2006-153554

(51) Int. Cl.
*H03F 3/08* (2006.01)
*G06K 9/00* (2006.01)
*G09G 5/02* (2006.01)

(52) U.S. Cl. ........ 358/518; 358/519; 358/520; 358/521; 358/523; 382/167; 345/590

(58) Field of Classification Search .................. 358/519, 358/520, 521, 523; 345/590
See application file for complete search history.

(56) References Cited

U.S. PATENT DOCUMENTS

| | | | | |
|---|---|---|---|---|
| 5,237,409 A | * | 8/1993 | Yamaguchi | 348/391.1 |
| 5,367,387 A | * | 11/1994 | Yamaguchi | 358/518 |
| 5,539,540 A | * | 7/1996 | Spaulding et al. | 358/518 |
| 5,583,666 A | * | 12/1996 | Ellson et al. | 358/518 |
| 5,712,925 A | | 1/1998 | Ohga | |
| 5,734,745 A | * | 3/1998 | Ohneda | 382/167 |
| 5,933,252 A | * | 8/1999 | Emori et al. | 358/500 |
| 6,437,792 B1 | * | 8/2002 | Ito et al. | 345/600 |
| 6,560,356 B1 | * | 5/2003 | Takahashi et al. | 382/162 |
| 2004/0086176 A1 | * | 5/2004 | Meier et al. | 382/162 |
| 2005/0024652 A1 | * | 2/2005 | Gondek | 358/1.9 |
| 2005/0047648 A1 | * | 3/2005 | Newman et al. | 382/162 |
| 2005/0099430 A1 | * | 5/2005 | Akiyama et al. | 345/600 |

FOREIGN PATENT DOCUMENTS

| | | |
|---|---|---|
| EP | 1022897 A2 | 7/2000 |
| JP | 04-186968 A | 7/1992 |
| JP | 6-225130 A | 8/1994 |
| JP | 07-107306 A | 4/1995 |
| JP | 2000-050091 A | 2/2000 |
| JP | 2000-083177 A | 3/2000 |
| JP | 2000-209449 A | 7/2000 |
| JP | 2000-278546 A | 10/2000 |
| JP | 2002-152538 A | 5/2002 |

* cited by examiner

*Primary Examiner* — Chan S Park
*Assistant Examiner* — Vincent R Peren
(74) *Attorney, Agent, or Firm* — Canon U.S.A., Inc. I.P. Division

(57) ABSTRACT

An image processing method is used to converting a color within a first color reproduction range that is a device-independent color space into a color within a second color reproduction range that is a color reproduction range of an output device. The image processing method includes defining, within the first color reproduction range, a third color reproduction range of a color that is estimated to be input; defining, within the second color reproduction range, a fourth color reproduction range that is smaller than the second color reproduction range; and, in performing the color conversion, compressing a color within the third color reproduction range into a color within the fourth color reproduction range and compressing a color within the first color reproduction range and outside the third color reproduction range into a color within the second color reproduction range and outside the fourth color reproduction range.

16 Claims, 34 Drawing Sheets

Prior Art

Prior Art

Prior Art

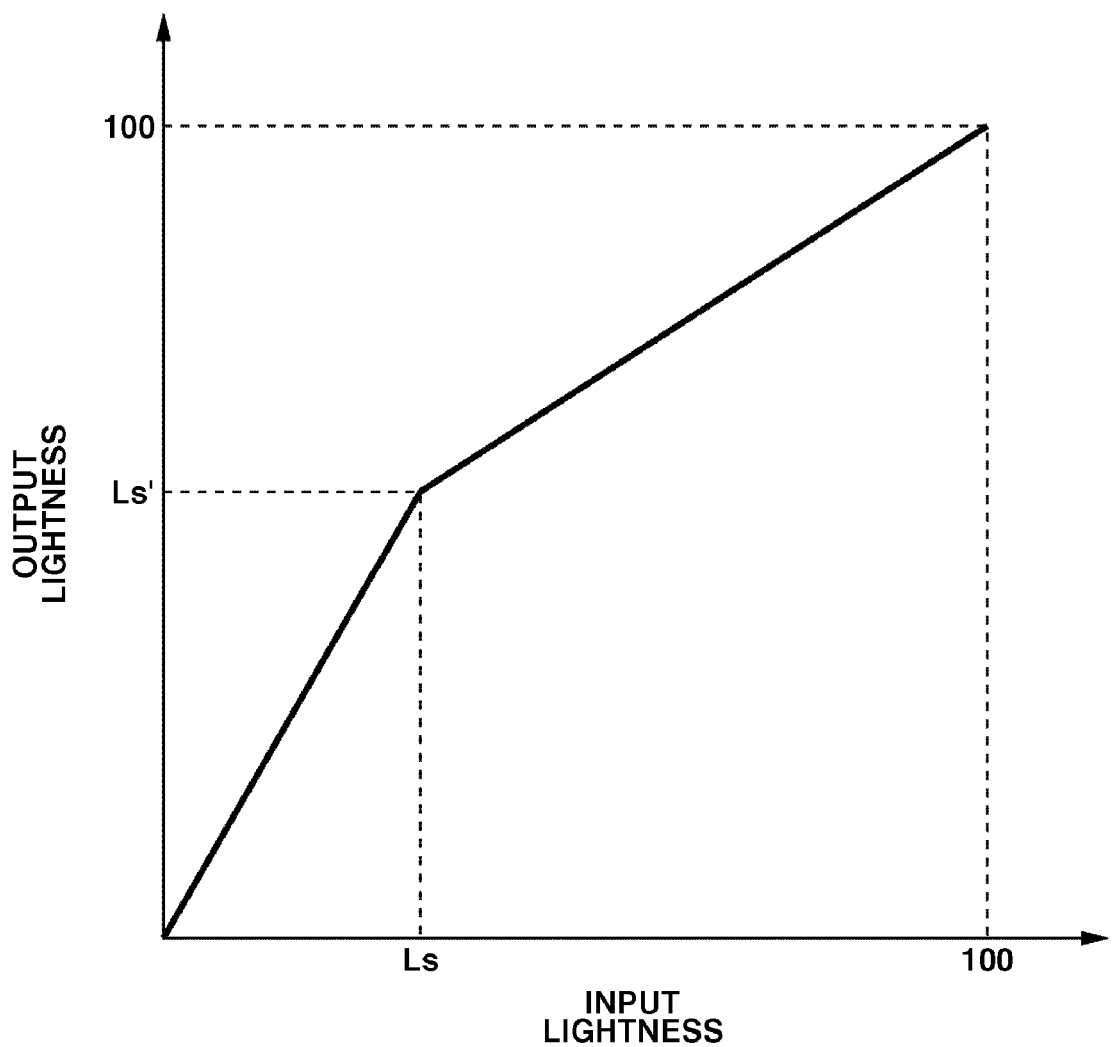

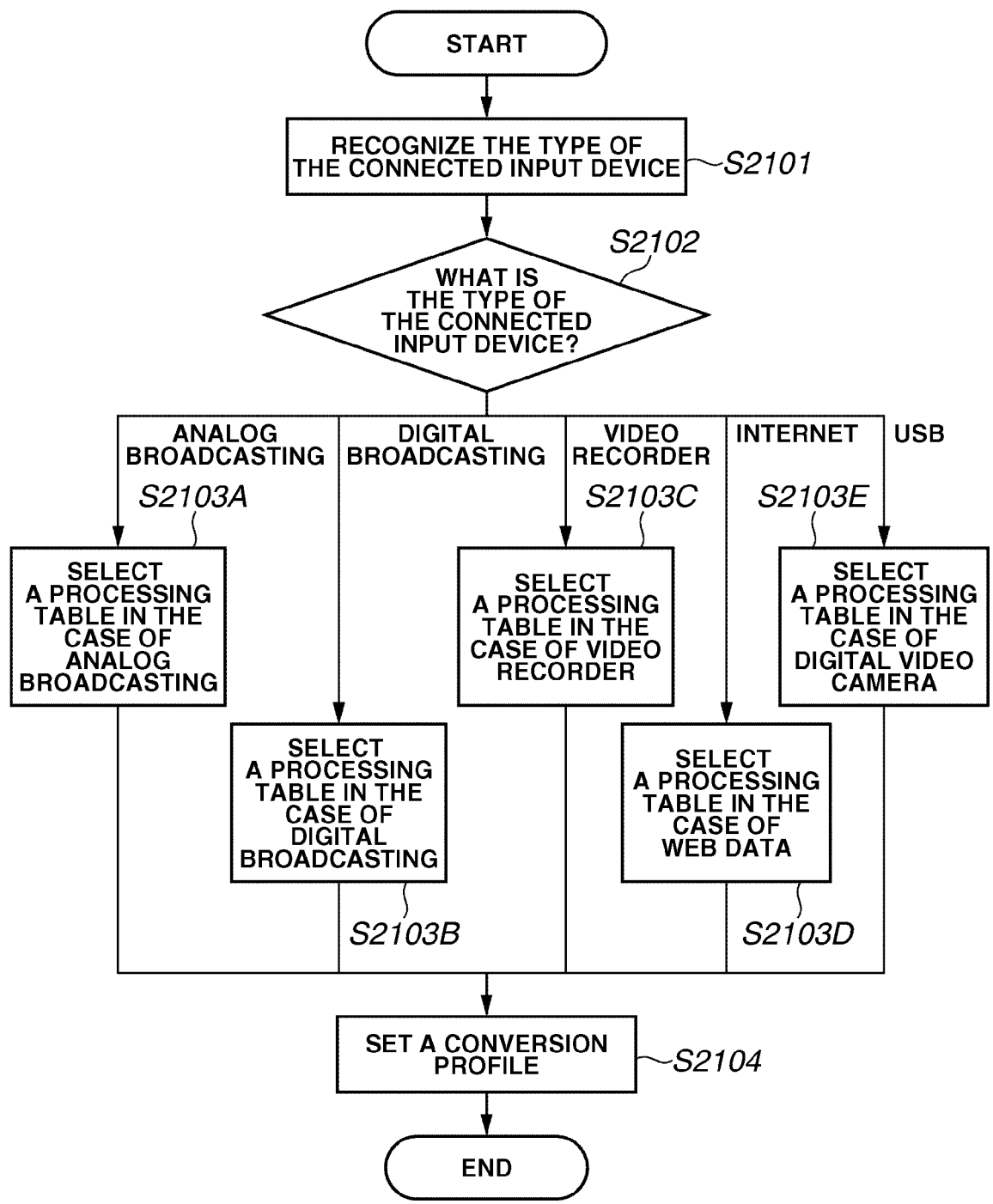

IMAGE PROCESSING APPARATUS AND METHOD FOR PERFORMING GAMUT MAPPING VIA DEVICE-INDEPENDENT STANDARD COLOR SPACE

BACKGROUND OF THE INVENTION

1. Field of the Invention

The present invention relates to gamut mapping by which a color gamut of an input device is converted into a color gamut of an output device via a device-independent standard color space.

2. Description of the Related Art

In recent years, a digital device such as a digital camera and an image scanner has been widespread, and thus a digital image can readily be obtained.

In addition, a technology for producing a full color hard copy has shown rapid progress. For example, the image quality of ink jet system printing has become as good as silver halide photography, and thus the ink jet system printing has been widely used.

Meanwhile, a network such as the Internet has become widespread, and thus, a great many users can connect various devices to the network.

Under an environment in which various types of input/output devices are connected, color image data is input and output between devices with different color reproduction ranges (color gamuts).

For example, color image signals having a certain color reproduction range that are displayed by the monitor are very frequently printed in a hard copy by using a printer having a narrower color reproduction range.

On the other hand, for a technology for color reproduction of the same color between different devices, a "color management system" (hereinafter simply referred to as "CMS") is known.

FIG. 1 is a diagram illustrating an overview of an exemplary configuration of the CMS. FIG. 1 illustrates the CMS that uses a device-independent color space.

That is, FIG. 1 illustrates a case where an image input device such as a camera or a scanner and an image output device such as a printer or a monitor are mutually connected, for example.

As shown in FIG. 1, a processing of converting a color signal that is processed by a certain input device into a color signal for an output device is implemented via a device-independent color space (for example, CIE-XYZ and CIE-L*a*b*) by using profiles for the input device and the output device.

Here, a "profile" is a description of a conversion formula that connects each device-dependent color with the device-independent color space or a description of a conversion table that is previously produced as a lookup table of the conversion formula.

For example, in an ICC profile, the CIE-XYZ color space and the CIE-L*a*b* color space under a D50 light source are defined as the device-independent color space used in the CMS (hereinafter referred to as a "standard color space").

Note here that the "ICC" refers to the "International Color Consortium".

In addition, under an environment where Windows®, which is an operating system of Microsoft Corporation, is used, another standard color space, namely, an "sRGB" color space (IEC 61966-2-1) is used.

In addition, recently, an Adobe RGB color space that is advocated by Adobe Systems, Inc. is used as the standard color space, in the input device such as a high-end digital camera.

The device-independent color reproduction can be implemented via the standard color space that is the device-independent color space.

In reproducing the color in the CMS by each device, in order to reproduce the color by the output device that can be reproduced by a certain device, a gamut mapping technology is used. In the gamut mapping, a difference in the color reproduction range between the input device and the output device is accommodated.

Japanese Patent Application Laid-Open No. 06-225130 discusses a mapping of image data to a color gamut of the device whose color reproduction range is narrower.

In addition, Japanese Patent Application Laid-Open No. 06-225130 discusses a method in which the color outside the color reproduction range of the device is compressed to an outermost shell of the color reproduction range of the device. In this method, a saturation only is subjected to the compression, while maintaining a lightness and a hue at a constant level.

There is another method of the gamut mapping. Japanese Patent Application Laid-Open No. 06-225130 discusses the gamut mapping such that the outside the color reproduction range of the device is compressed to the color so that a color difference in the CIE-L*a*b* color space is minimized.

However, the method by which the gamut mapping performed via the standard color space is implemented by using the lookup table (hereinafter referred to as an "LUT") has drawbacks as described below.

More specifically, there is a drawback arising with respect to a relationship between a size and shape of the standard color space and the color reproduction range of the input device and the output device.

In this regard, first, there is a drawback caused with respect to an inclusion relationship between the size of the standard color space and the color reproduction range of each of the input device and the output device.

FIG. 2 is a diagram illustrating a case where in producing the LUT, which is the profile for the output device, the standard color space does not include the whole part of the color reproduction range of the output device.

FIG. 2 illustrates an sRGB color space 201 as the standard color space and a color gamut 202 of an inkjet printer, which is an example of the output device, in the CIE-L*a*b* color system.

In addition, a shaded region 203 indicates a range of the printer color gamut that extends off the standard color space. If the color outside the color gamut is input from the input device, information at the region 203 is lost at the time of conversion into the standard color space.

That is, in order to effectively use the whole color gamut of the output device and exploit a full color reproduction capacity of the output device, it is necessary to use the standard color space that includes the color gamut of the output device.

On the other hand, there is a case where the standard color space that satisfies the condition is far larger than the color gamut to which the color is estimated to be actually input (hereinafter referred to as an "input-estimated color gamut"), and, therefore, there is a drawback caused by this.

The standard color space tends to be wider than the input-estimated color gamut because of the following reasons. The first reason is that the standard color space in the specification of the ICC profile is used. The second reason is that with respect to the output device having any color reproduction range, the LUT is produced after the standard color space is defined so that the whole color reproduction range is included in the standard color space.

Here, the input-estimated color gamut is the color gamut as described below. For example, the description is made as to a case where the output device is an inkjet printer and an input image to be printed is a photographic image that is photographed by a digital camera.

Generally, in a popular type digital camera, a color signal obtained by an input sensor is converted into YCbCr data by a given processing, estimating the compression to the sRGB color space.

That is, the color input through the digital camera is turned into the color within the sRGB color space. In this case, the sRGB color space is defined as the input-estimated color gamut.

In this manner, in producing the LUT, the color gamut of the input that is input most in a system that uses the LUT is defined to be the input-estimated color gamut.

When the input-estimated color gamut is the sRGB color space as described above and the standard color space is the CIE-L*a*b* color space or the Adobe RGB color space, for example, the standard color space is wider than the sRGB color space which is the input-estimated color gamut.

FIG. 3 is a diagram illustrating a relationship among a CIE-L*a*b* color space 301, a printer color gamut 302, and an input-estimated color gamut (sRGB color space) 303. Here, the CIE-L*a*b* color space 301 is an example of a wide standard color space.

In converting the CIE-L*a*b* color space 301 by using the profile for the output device and performing the gamut mapping to the printer color gamut 302, a color X that is a color positioned in the color gamut outside the input-estimated color gamut 303 also needs to be compressed to the color gamut of the output device.

That is, the color that is not likely to be actually input needs to be compressed with a secured color reproduction by the output device.

Thus, the color gamut within the printer color gamut 302 is allocated even for the color that is not likely to be actually input, and accordingly, the region in which the color of the input-estimated color gamut 303 is reproduced is small.

In this case, when a photograph is printed by the printer, the quality of a resulting photographic image is not good because a color collapse occurs and the saturation is degraded.

A second drawback is caused because the size of the color gamut of the output device compared to the standard color space is different depending on a print medium that is used.

Generally, the size of the color gamut of the output device differs depending on the type of the print medium and a targeted print quality. In this regard, when the output device is an inkjet printer, the color gamut in the case of printing onto a photograph paper is wide and the color gamut in the case of printing onto a plain paper is narrow.

Accordingly, when the standard color space that includes the color gamut of the output device is used, a color reproducibility in the case where the mapping is performed in a manner such that the color gamut of the photograph paper providing a gradation differs from the color reproducibility in the case where the mapping is performed with respect to the color gamut of the plain paper.

That is, in mapping to the color gamut of the photograph paper, the saturation and the lightness are not degraded much, and in mapping to the color gamut of the plain paper, the saturation and the lightness are degraded very much.

As a result, the print image gets somber and a contrast becomes low. Thus, a good reproduction of color cannot be implemented.

SUMMARY OF THE INVENTION

The present invention is directed to performing a color reproduction of a color in an input-estimated color gamut by effectively using a color gamut of an output device and to securing a good color reproduction of the color outside the input-estimated color gamut.

According to an aspect of the present invention, an image processing method for converting a color within a first color reproduction range that is a device-independent color space into a color within a second color reproduction range that is a color reproduction range of an output device includes defining, within the first color reproduction range, a third color reproduction range of a color that is estimated to be input; defining, within the second color reproduction range, a fourth color reproduction range that is smaller than the second color reproduction range; and converting a color within the first color reproduction range into a color within the second color reproduction range by compressing a color within the third color reproduction range into a color within the fourth color reproduction range and compressing a color within the first color reproduction range and outside the third color reproduction range into a color within the second color reproduction range and outside the fourth color reproduction range.

According to the above configuration, the third color reproduction range of a color that is estimated to be input is defined, and a color within the third color reproduction range is compressed to a color within the fourth color reproduction range included in the second color reproduction range of the output device. Thus, most color signals to be input can be compressed while maintaining a condition such as a gradation and colorimetrical color matching. In addition, even when a color outside the third color reproduction range is input, the color outside the third color reproduction range can be compressed to a color within the second color reproduction range and outside the fourth color reproduction range.

As a result, the color gamut of the output device can be effectively used. In addition, a color within the input-estimated color gamut can be reproduced well, and a color outside the input-estimated color gamut can be surely reproduced.

According to another aspect of the present invention, an image processing method for converting a color within a first color reproduction range that is a device-independent color space into a color within a second color reproduction range that is a color reproduction range of an output device includes: defining, within the first color reproduction range, a third color reproduction range of a color that is estimated to be input; and converting a color within the first color reproduction range into a color within the second color reproduction range such that a color into which a color within the third color reproduction range is converted differs in gradation from a color into which a color outside the third color reproduction range is converted.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 is a diagram illustrating a processing for enhancing a lightness in the color gamut deformation according to the fifth exemplary embodiment of the present invention.

FIG. 34 is a flow chart illustrating a method of selecting the color conversion table according to a tenth exemplary embodiment of the present invention.

DETAILED DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 4:
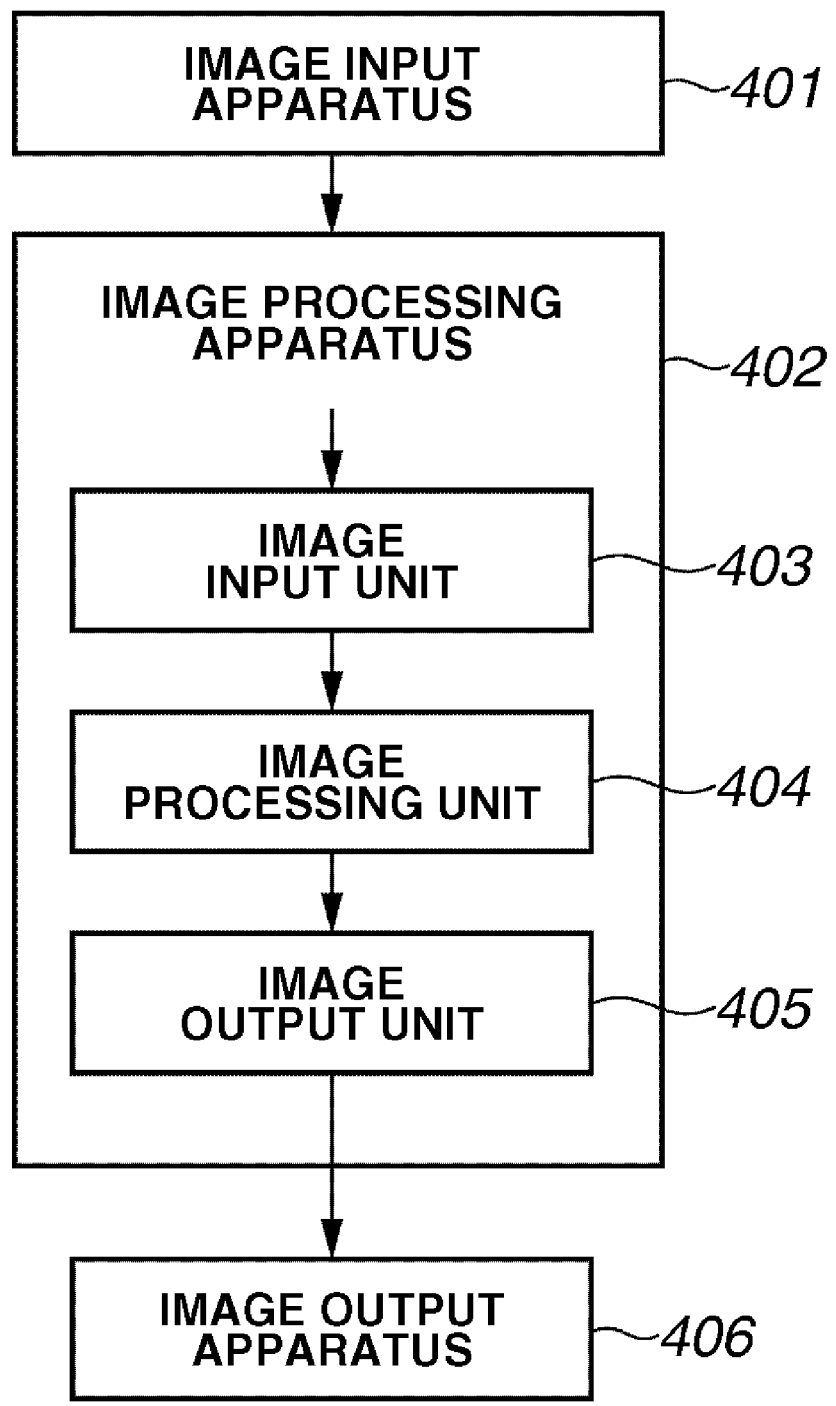
FIG. 4 is a block diagram illustrating a configuration of an image processing system according to a first exemplary embodiment of the present invention.

FIG. 4 is a block diagram illustrating a configuration of an image processing system according to an exemplary embodiment of the present invention. In FIG. 4, an image input apparatus 401 is, for example, a digital camera or an image scanner.

An image processing apparatus 402 allows an image processing unit 404 to perform a given image processing such as gamut mapping using the LUT as described in embodiments described below to image data input through an image input unit 403. In addition, the image processing apparatus 402 outputs print data finally obtained by an image output unit 405 to an image output apparatus 406.

Here, the image processing apparatus 402 may be, for example, a personal computer (PC).

Note that this embodiment is not limited to this. That is, a part or the whole part of the processing performed by the image processing device may be implemented by a printing device such as a printer. For example, in a configuration such that the image photographed by the digital camera is directly input to the printer to print out an image, the printer includes an image processing apparatus. Here, the image output apparatus 406 may be the printing device such as a printer, or may be a monitor.

In addition, the production of an LUT that is described in each embodiment described below may be implemented by a personal computer (PC) that is the image processing apparatus mentioned above. In addition, the produced LUT may be stored in a given memory of the PC that is the image processing apparatus or the printer to be used in the processing.

Figure 5:
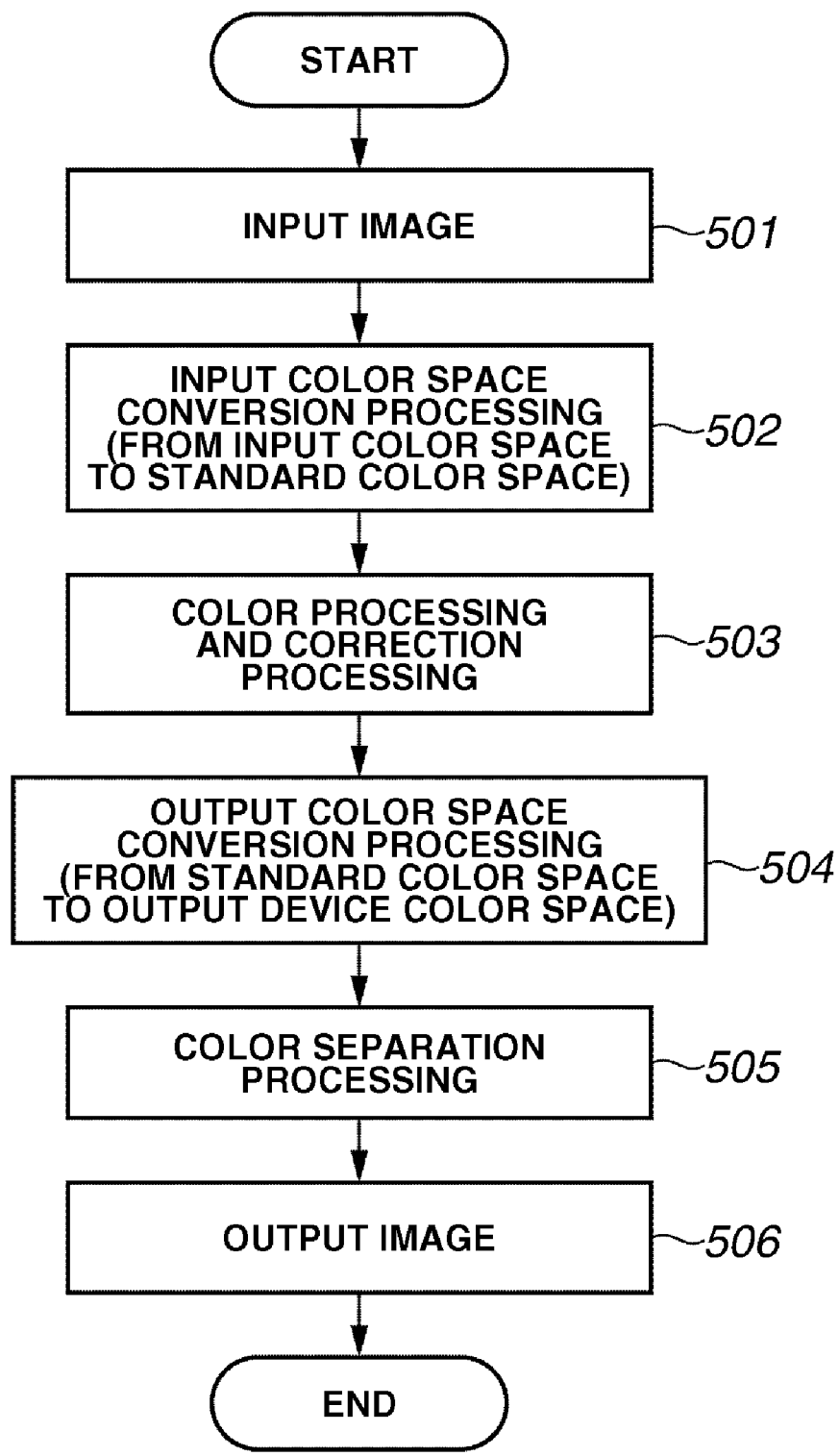
FIG. 5 is a flow chart of exemplary processing performed by an image processing device as shown in FIG. 4.

FIG. 5 is a flow chart of exemplary processing performed by the image processing apparatus 402 shown in FIG. 4.

First, an image is input in step 501 and then the input image is subjected to a processing for converting the input color space in step 502. The processing for converting the input color space is the processing for converting a color signal in a color space of the input device into the color signal in a standard color space.

Next, in step 503, in order obtain an image of a good appearance, a color processing and a correction processing such that a saturation and a lightness of the input image is improved and a color tint is corrected are performed.

A gamut mapping by which the color signal in the standard color space is converted into the color signal in a color gamut of the output device is performed in step 504.

Then, a color unique to the device is obtained based on the color that is subjected to the gamut mapping. Finally, the processing such as color separation and quantization is performed in step 505, and then the image is output in step 506.

In each embodiment as described below, the LUT that is used in the gamut mapping in step 504 or a method of producing the LUT is described.

Note that in the exemplary embodiments described below, a system that uses an inkjet printer as the image output apparatus is described.

In addition, each color space that is used in each embodiment is handled in a CIE-L*a*b* color system.

Note that the color system is not limited to the CIE-L*a*b* color system. That is, an embodiment of the present invention may also be implemented by using an equivalent color space such as L*u*v* color space.

First Embodiment

A first embodiment of the present invention relates to the LUT of the gamut mapping by which a method of compressing a color to a printer color gamut differs with respect to the color that is positioned within an input-estimated color gamut and the color that is positioned outside the input-estimated color gamut.

Figure 6:
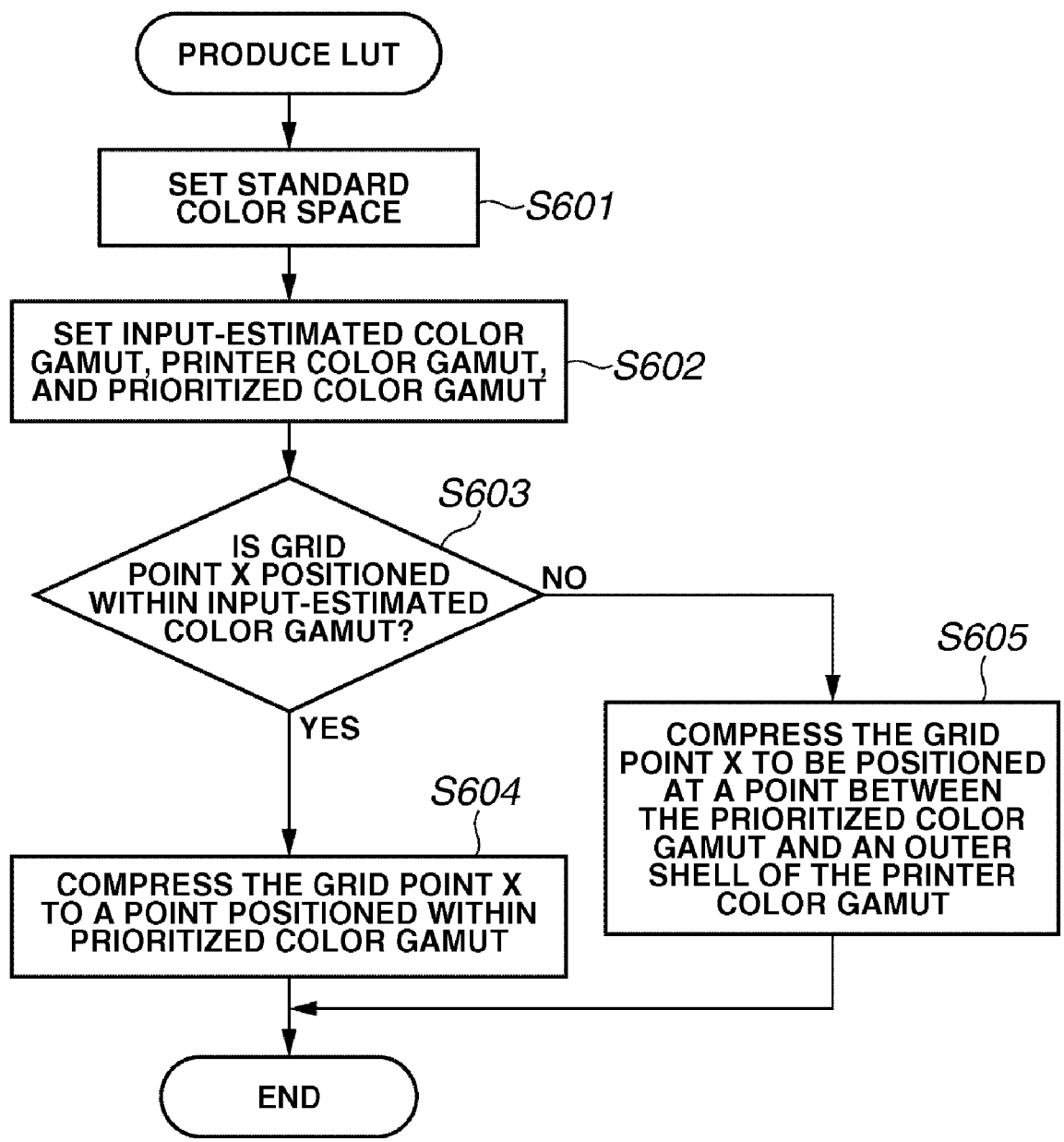
FIG. 6 is a flow chart of a processing for producing the LUT used for a gamut mapping according to the first exemplary embodiment of the present invention.
Figure 7:
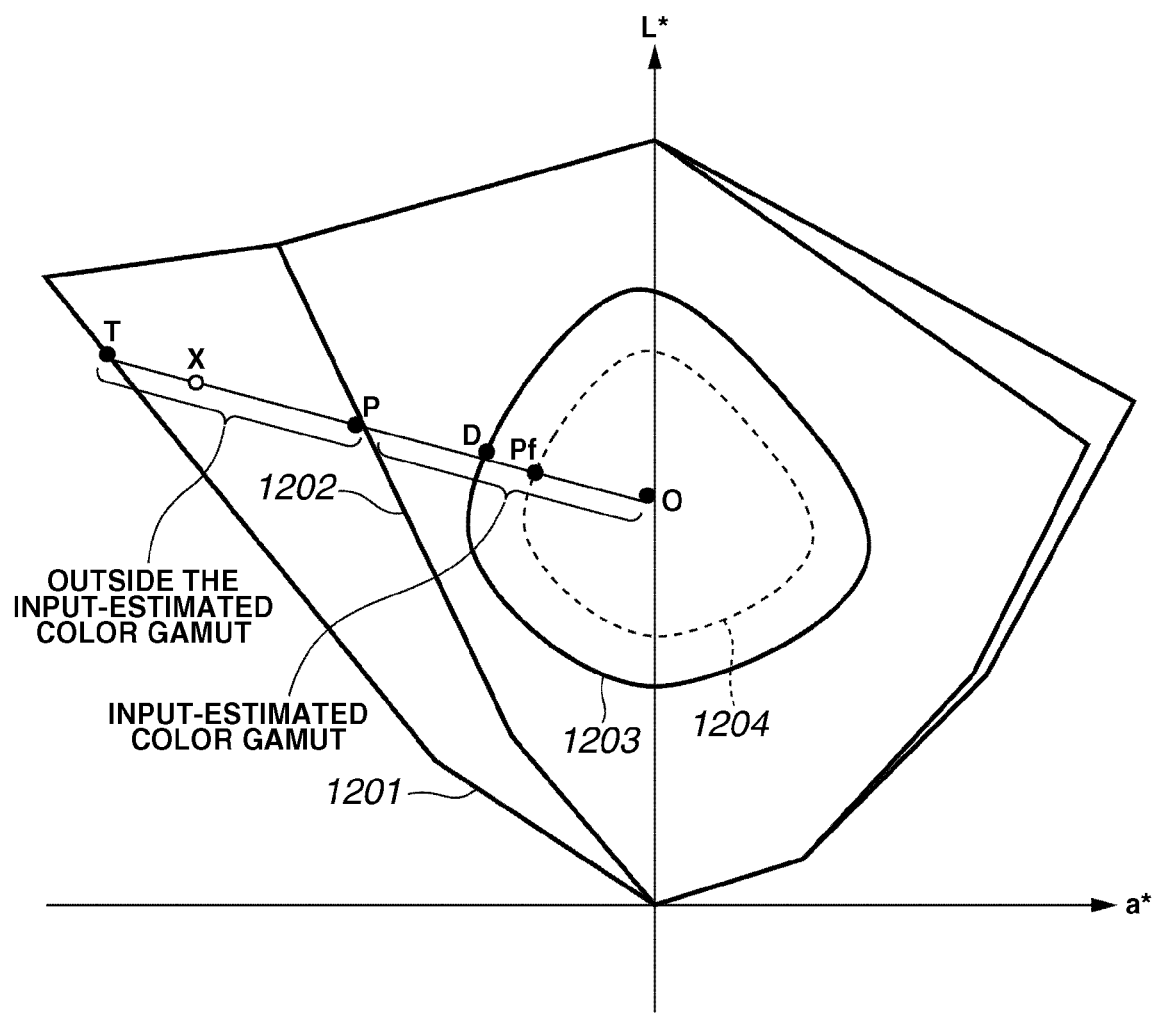
FIG. 7 is a diagram illustrating a standard color space, an input-estimated color gamut, and an inkjet printer color gamut, which are defined by the LUT.

FIG. 6 is a flow chart of a processing for producing the LUT. FIG. 7 is a diagram illustrating a standard color space 1201, an input-estimated color gamut 1202, and an inkjet printer color gamut 1203, which are defined by the LUT.

Here, it is desirable that the standard color space according to this embodiment includes the color gamut of the output device as described above. Thus, a color space having a color gamut wider than the Adobe RGB color space (hereinafter referred to as a "wide gamut RGB color space") is used.

In addition, a principal use of the input-estimated color gamut is, in the case of the inkjet printer in this embodiment, to print an image photographed by a digital camera and to print a document.

Therefore, the color gamut of an image to be frequently input lies within the sRGB color space. Thus, in this embodiment, the input-estimated color gamut is the sRGB color space.

Referring to FIG. 6, first, the standard color space is set in step S601. More specifically, each grid point of the LUT is set so that a color obtained by combining RGB values that define each grid point of the LUT exists within the standard color space that is described in the L*a*b* color space, for example.

Next, in step S602, the input-estimated color gamut 1202, the printer color gamut 1203, and a prioritized color gamut 1204, which is to be described below, are set.

That is, with respect to the input-estimated color gamut, the printer color gamut, and the prioritized color gamut described in the L*a*b* color space, data of a combination of the RGB values corresponding to each color gamut is set.

As shown in FIG. 7, the compression is performed in a direction along a straight line extending from a point (color) O that is positioned on the axis of the lightness and determined as a compression destination to a color X of a compression target grid point.

On this straight line, a region defined by a straight line OP is the region of the input-estimated color gamut 1202, and the region defined by a straight line PT which is positioned outside the region of the input-estimated color gamut 1202 indicates an outside of the input-estimated color gamut 1202.

In the setting that is performed in step S602, first, the distance from the point O to the point X is taken as a distance OX, the distance from the point O to a point of intersection T between the straight line and an outermost shell of the standard color space 1201 is taken as a distance OT, and the distance from the point O to a point of intersection P between the straight line and an outermost shell of the input-estimated color gamut 1202 is taken as a distance OP. In addition, a distance OD from the point O to a point of intersection D between the straight line and an outermost shell of the printer color gamut 1203 is computed.

Next, a color gamut to which the input-estimated color gamut 1202 is compressed (hereinafter referred to as the "prioritized color gamut") 1204 is set.

The prioritized color gamut 1204 is confined by the distance OD because the prioritized color gamut 1204 needs to be within the printer color gamut 1203. On the other hand, a color positioned outside the input-estimated color gamut 1202 is compressed to a color within the printer color gamut 1203.

Thus, in this embodiment, a color gamut reduced to eighty percent of the distance OD is taken as the prioritized color gamut 1204. Then, the distance from the point O to a point of intersection Pf between the straight line and an outermost shell of the prioritized color gamut 1204 is taken as a distance OPf.

In step S603, based on data of each color gamut that is set in step S602, it is determined whether the grid point X, which is a target of the gamut mapping, is positioned within the input-estimated color gamut 1202. Then, a method of compression differs depending on whether the compression target point X is positioned within the input-estimated color gamut 1202 or outside the input-estimated color gamut 1202.

Suppose that a compression destination point to be computed is taken as X'. When the compression target point X is determined to be positioned within the input-estimated color gamut 1202 in step S603, then in step S604, the point X is compressed to the point X' having a distance OX' within the prioritized color gamut 1204.

The distance OX' is computed by using a compression function (1.1) as described below. That is, as is clear from the compression function and FIG. 8, a compression with maintaining an even gradation is performed in this compression processing.

By computing the point X' in relation to the point X in this manner, in producing the LUT, grid point data of the grid point X is expressed in a combination of RGB values that represent the point X'.

$$OX'=(OX \times OPf)/OP \qquad (1.1)$$

On the other hand, when the point X is determined to be positioned outside the input-estimated color gamut 1202, the distance OX' is computed by using a compression function (1.2) as described below, and the point X is compressed to the point X' positioned between the boundary Pf of the prioritized color gamut 1204 and the point D on the outermost shell of the printer color gamut 1203 (step S605).

Figure 8:
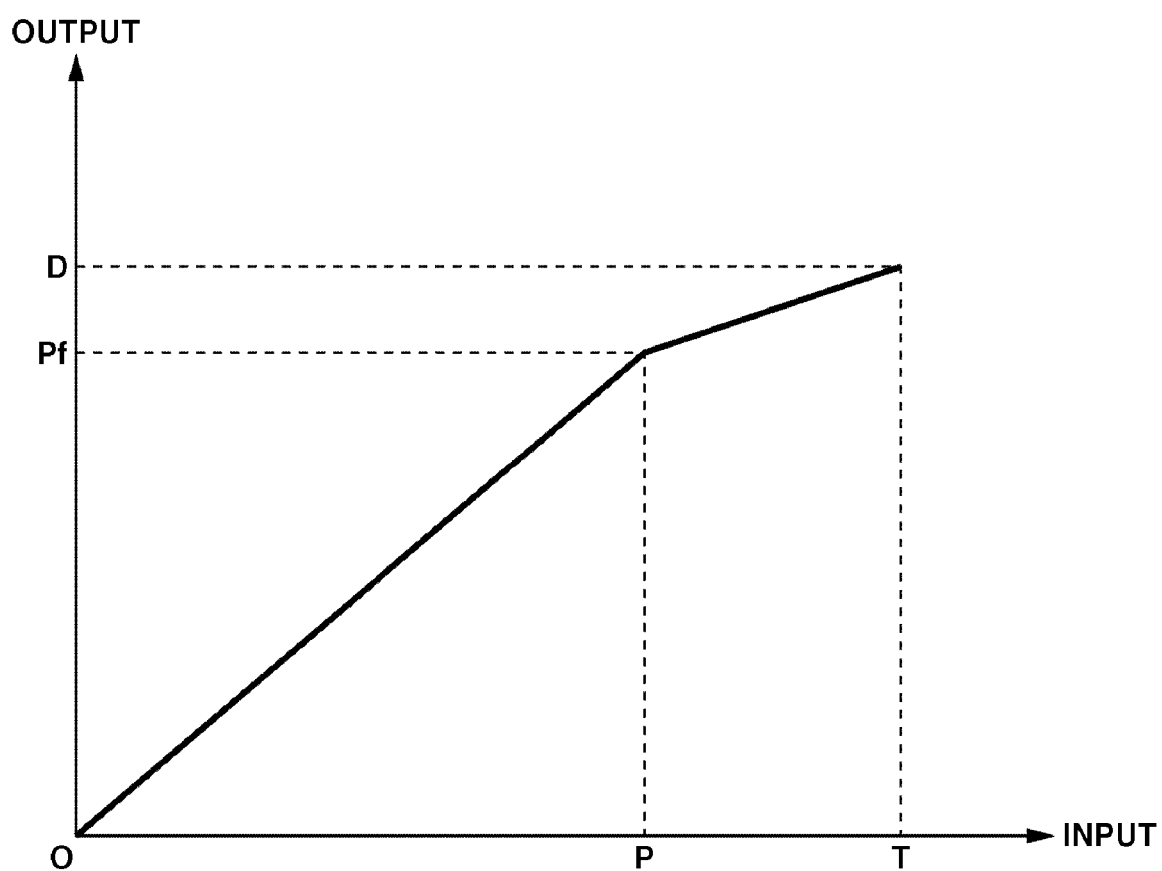
FIG. 8 is a diagram illustrating compression functions that are used in the first exemplary embodiment of the present invention.

As is clear from the compression function (1.2) and FIG. 8, a color outside the input-estimated color gamut is compressed to a color within a range narrower than the range to which a color within the input-estimated color gamut 1202 is compressed.

By computing the point X' in relation to the point X in this manner, in producing the LUT, grid point data of the grid point X is expressed in a combination of RGB values that represent the point X', just as described above.

Here, a distance PX indicates a distance from the boundary of the input-estimated color gamut 1202 to the grid point X. In addition, a distance PfD indicates a distance from the boundary of the prioritized color gamut 1204 to the outer shell of the printer color gamut 1203, and a distance PT indicates a distance from the boundary of the input-estimated color gamut 1202 to the outermost shell of the standard color space 1201.

$$OX'=(PX \times PfD)/PT+OPf \qquad (1.2)$$

In this manner, all the grid points in the standard color space 1201 can be compressed to the printer color gamut 1203 by using the gamut compression.

Thus, in performing the compression, a color after being subjected to the compression in the printer color gamut is determined in accordance with whether a color to be compressed is positioned within the input-estimated color gamut or outside the input-estimated color gamut. As a result, a color within the input-estimated color gamut can be appropriately compressed without a color collapse, by taking the comparatively wide color gamut of the color that is compressed, namely, the comparatively wide prioritized color gamut. In other words, a color within the input-estimated color gamut can be reproduced with a higher gradation than a color outside the input-estimated color gamut.

In addition, with respect to a color positioned outside the input-estimated color gamut, the color gamut of the compressed color can be secured within the printer color gamut, and thus a color positioned outside the input-estimated color gamut can be reproduced by the printer, without a color collapse.

Second Embodiment

In the method as described in the first embodiment, in which the standard color space is compressed to the color gamut of the output device with maintaining an even gradation, good gradation reproducibility can be obtained. However, in the method according to the first embodiment, a colorimetric difference arises with respect to all the colors. As a result, the color is reproduced differently for each different output device.

Meanwhile, a gamut compression method that implements a calorimetric matching is known. However, when this method is used, a color collapse occurs with respect to all of the colors outside the printer color gamut, and a good color reproduction cannot be implemented in some cases.

In a second embodiment of the present invention, the color gamut in which a calorimetrically approximated color reproduction is performed (hereinafter referred to as a "calorimetrically matching color gamut") is provided within the color gamut of the output device. Thus, color reproduction is performed such that a color within the calorimetrically matching color gamut among the colors within the standard color space is calorimetrically approximated as it is.

Then, a color positioned outside the calorimetrically matching color gamut is compressed to the color gamut of the output device (in this embodiment, the printer color gamut), which lies outside the outer shell of the calorimetrically matching color gamut.

Thus, with respect to the output devices of different types, a color positioned within the colorimetrically matching color gamut can be colorimetrically approximated, and the gradation of a color positioned outside the colorimetrically matching color gamut does not collapse so as to perform the compression while securing a good color reproduction.

Figure 9:
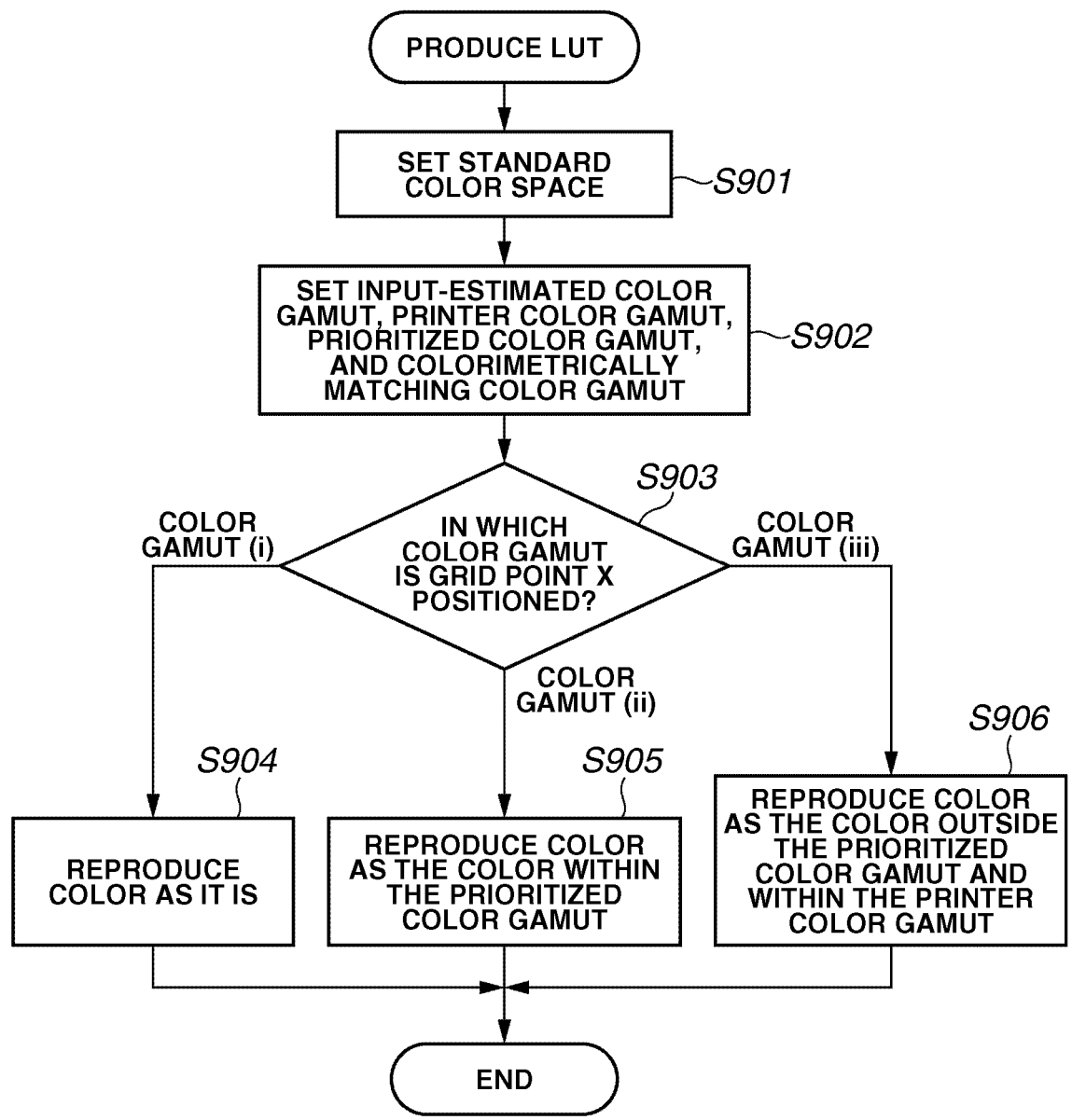
FIG. 9 is a flow chart of a processing for producing the LUT according to a second exemplary embodiment of the present invention.

FIG. 9 is a flow chart of a processing for producing the LUT according to the second exemplary embodiment.

Figure 10:
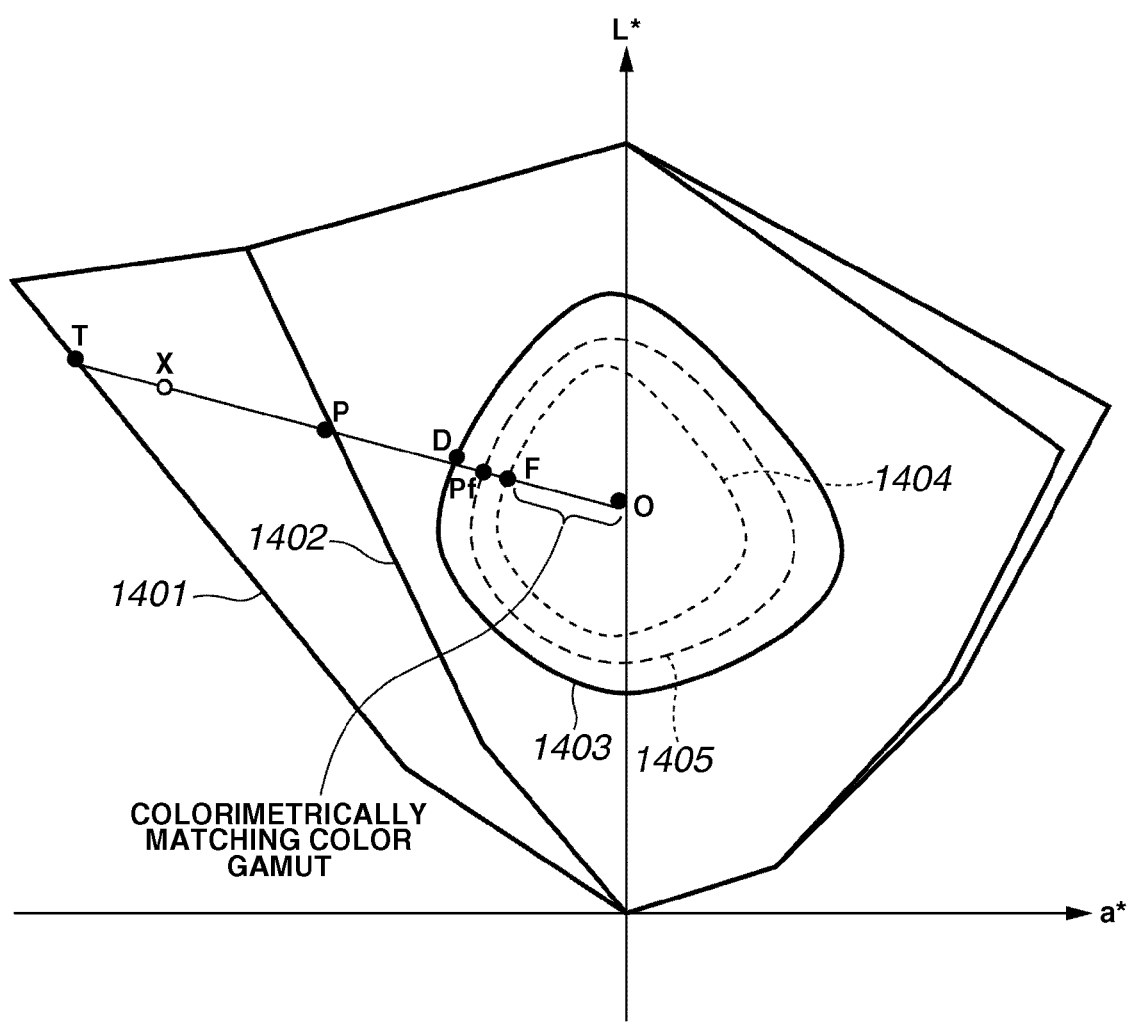
FIG. 10 is a diagram illustrating a standard color space, an input-estimated color gamut, a printer color gamut, and a calorimetrically matching color gamut, which are defined by the LUT.

In addition, FIG. 10 is a diagram illustrating a standard color space 1401, an input-estimated color gamut 1402, an inkjet printer color gamut 1403, a prioritized color gamut 1405, and a calorimetrically matching color gamut 1404, which are defined by the LUT. The calorimetrically matching color gamut 1404 is described below.

Referring to FIG. 10, the point of intersection between a straight line extending from a compression destination point O to a compression target grid point X and the boundary of the calorimetrically matching color gamut 1404 is taken as a point F. The distance between the point O and the point F is taken as a distance OF. Other points are the same as the points as illustrated in FIG. 7 according to the first embodiment.

In the second embodiment, the calorimetrically matching color gamut 1404 is a color gamut having a figure similar to the printer color gamut 1403 and a volume of about sixty percent of the volume of the printer color gamut 1403. Here, while the calorimetrically matching color gamut has a similar figure as the printer color gamut, the calorimetrically matching color gamut does not need to have the similar figure as the printer color gamut.

Referring to FIG. 9, the standard color space 1401 is set in step S901. In step S902, the input-estimated color gamut 1402, the printer color gamut 1403, the prioritized color gamut 1405, and the calorimetrically matching color gamut 1404 are set.

A detailed way of setting each color gamut is similar to that described in the first embodiment.

In step S903, in which color gamut the compression target grid point X is positioned is determined with respect to each color gamut that is set as described above. More specifically, in which of color gamuts (i) through (iii) the compression target grid point X is positioned is determined.

(i) Within the colorimetrically matching color gamut 1404;

(ii) Outside the calorimetrically matching color gamut 1404 and within the input-estimated color gamut 1402; and (iii) Outside the input-estimated color gamut 1402 and within the standard color space 1401.

When it is determined that the point X is positioned in the colorgamut (i), then in step S904, the color is compressed in accordance with a compression function (2.1) as described below. That is, a gamut mapping is performed so that the input color is faithfully reproduced.

$$OX'=OX \quad (2.1)$$

When it is determined that the point X is positioned within the color gamut (ii), then in step S905, the color is compressed in accordance with a compression function (2.2) described below.

$$OX'=OF+(FX \times FPf)/FP \quad (2.2)$$

When it is determined that the point X is positioned within the color gamut (iii), then in step S906, the color is compressed in accordance with a compression function (2.3) described below.

$$OX'=OPf+(PX \times PfD)/PT \quad (2.3)$$

When a compression destination point X' is determined, the RGB values thereof are stored as grid point data of the grid point X.

Figure 11:
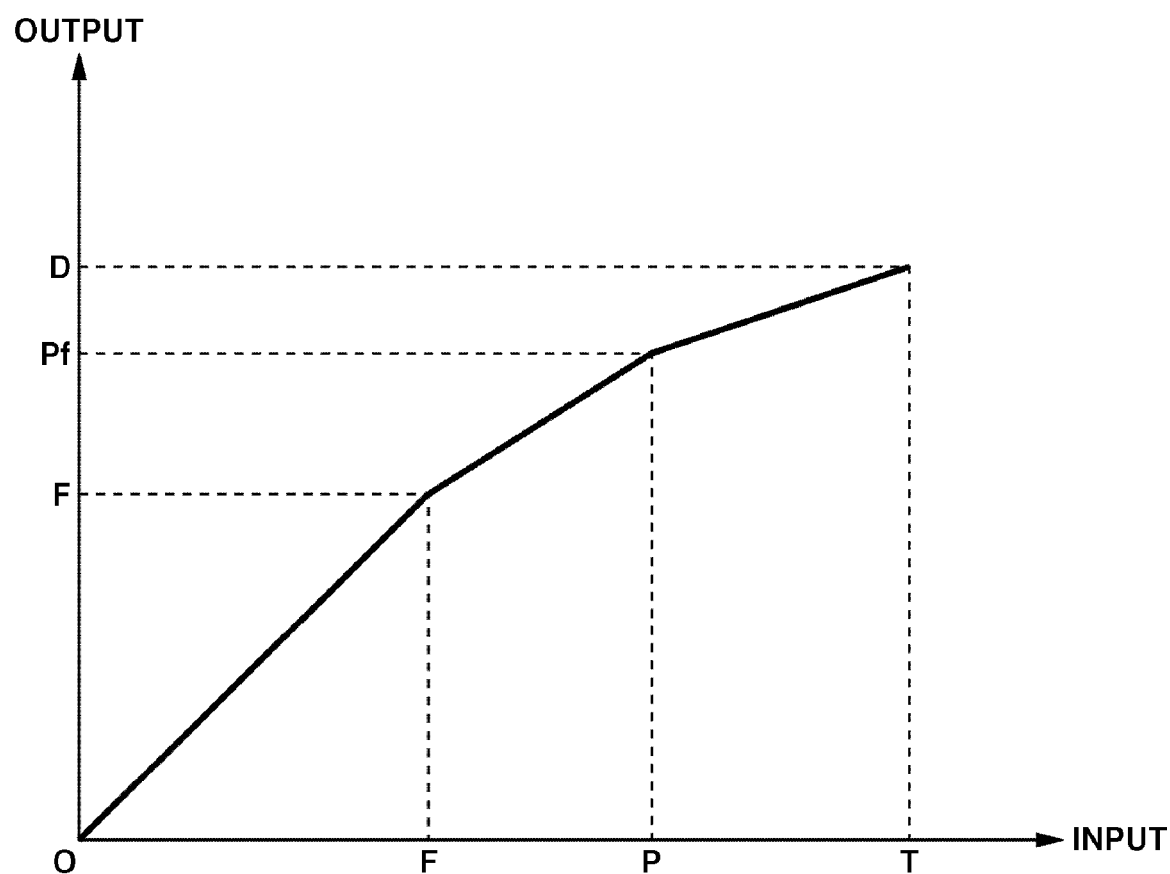
FIG. 11 is a diagram illustrating compression functions that are used in the second exemplary embodiment of the present invention.

FIG. 11 is a diagram illustrating the compression functions (2.1), (2.2), and (2.3) described above.

As is clear from FIG. 11, among the colors in the standard color space, the color in the color gamut (i) is faithfully reproduced as it is, and the color within the color gamut (ii) is reproduced as the color outside the calorimetrically matching color gamut 1404 and within the prioritized color gamut 1405.

In addition, the color in the color gamut (iii) is compressed to a color outside the prioritized color gamut 1405 and within the printer color gamut 1403.

In this manner, in this embodiment, the calorimetrically matching color gamut is especially provided, and thus the colorimetrically matching compression of the color within the colorimetrically matching color gamut is implemented. In addition, no color collapse occurs with respect to the color outside the calorimetrically matching color gamut because of the compression.

Note that in each embodiment as described above, the compression function is the function using a one-dimensional straight line. However, the compression function is not limited to this. That is, a quadric or an exponential function may be used.

In addition, in each embodiment as described above, the method of compression performed toward one compression destination point is described. However, the method of compression is not limited to the gamut compression method.

For example, a compression method by which compression is performed toward an achromatic axis with maintaining the lightness or a compression method by which no reversal of saturation occurs, which is described in detail below, can be implemented.

Third Embodiment

A third embodiment of the present invention is directed to an LUT configuration of the gamut mapping for solving a problem arising in relation to difference in the shape and the size of the color gamut of the output device depending on a print medium used for the output device.

Generally, the color gamut in the case where a plain paper is used as the print medium is narrower than the color gamut in the case where a photograph paper is used. In addition, the volume of the color gamut in the case where a plain paper is used as the print medium is smaller than the volume of the color gamut in the case where a photograph paper is used.

Figure 12:
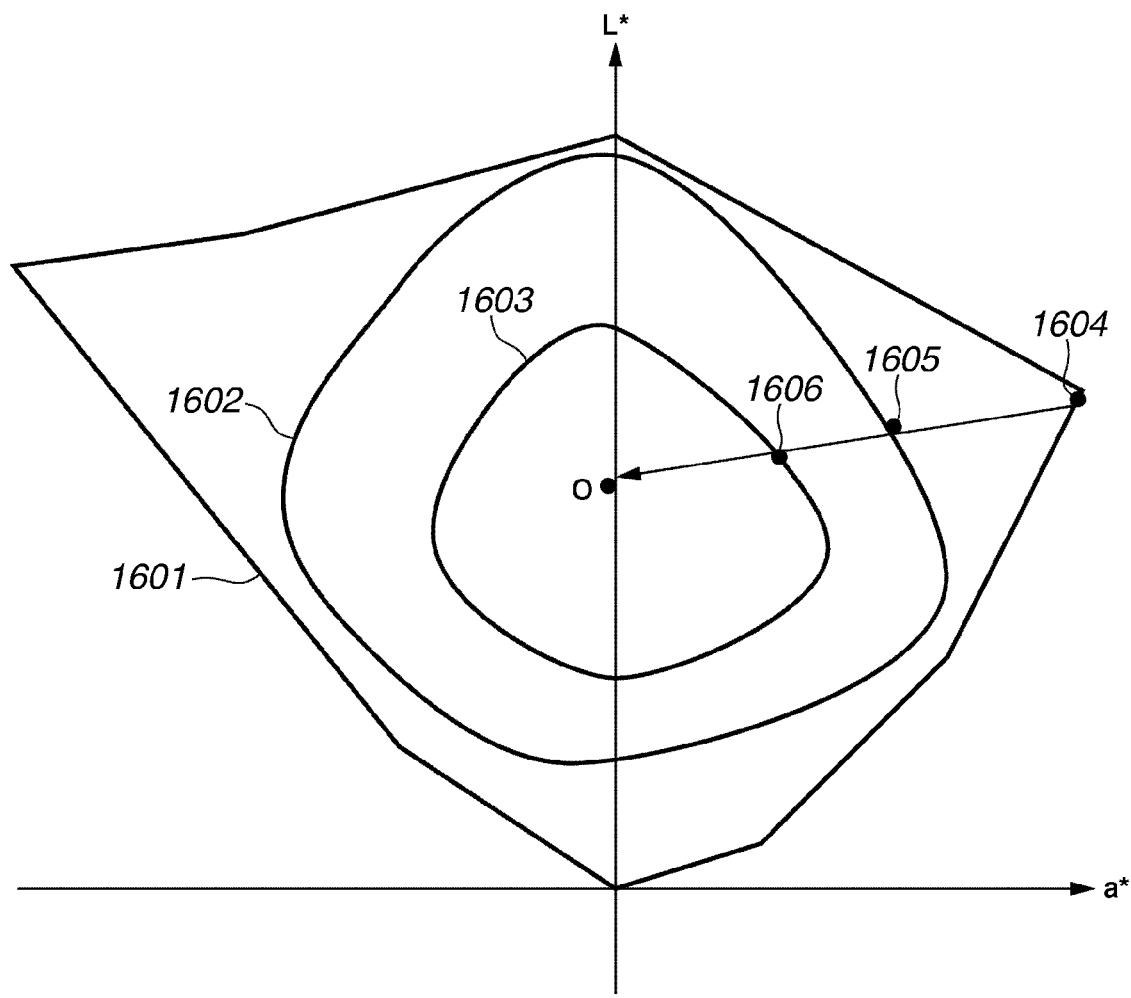
FIG. 12 is a diagram illustrating the compression to the color gamut of a plain paper and the color gamut of a photograph paper according to a third exemplary embodiment of the present invention.

A color gamut 1603 and a color gamut 1602 shown in FIG. 12 indicate the color gamut of the inkjet printer in the case of printing onto the plain paper and to the photograph paper, respectively.

In addition, in the third embodiment, a wide gamut RGB color space 1601 is used as the standard color space that can include the color gamut of the photograph paper and the color gamut of the plain paper, just as described in each embodiment above.

For example, when a point in the standard color space such as a point 1604 is compressed toward a compression destination point O by a method in which the gradation is maintained within the color gamut of the photograph paper, the point 1604 is compressed to the position of a point 1605.

In addition, when the point 1604 is compressed to the color gamut of the plain paper, the point 1604 is compressed to the position of a point 1606.

That is, when the compression is performed to the point within the color gamut of the plain paper, the saturation and the lightness are degraded compared to the case of compression to the point within the color gamut of the photograph paper.

In this regard, the input-estimated color gamut is provided in accordance with the printer color gamut.

For example, in the case of the narrow color gamut as in the case of the color gamut of the plain paper, the input-estimated color gamut is taken as a narrow color gamut such as the sRGB color space so as to produce the LUT with a priority on the color reproduction on the color within the sRGB color space.

Figure 13:
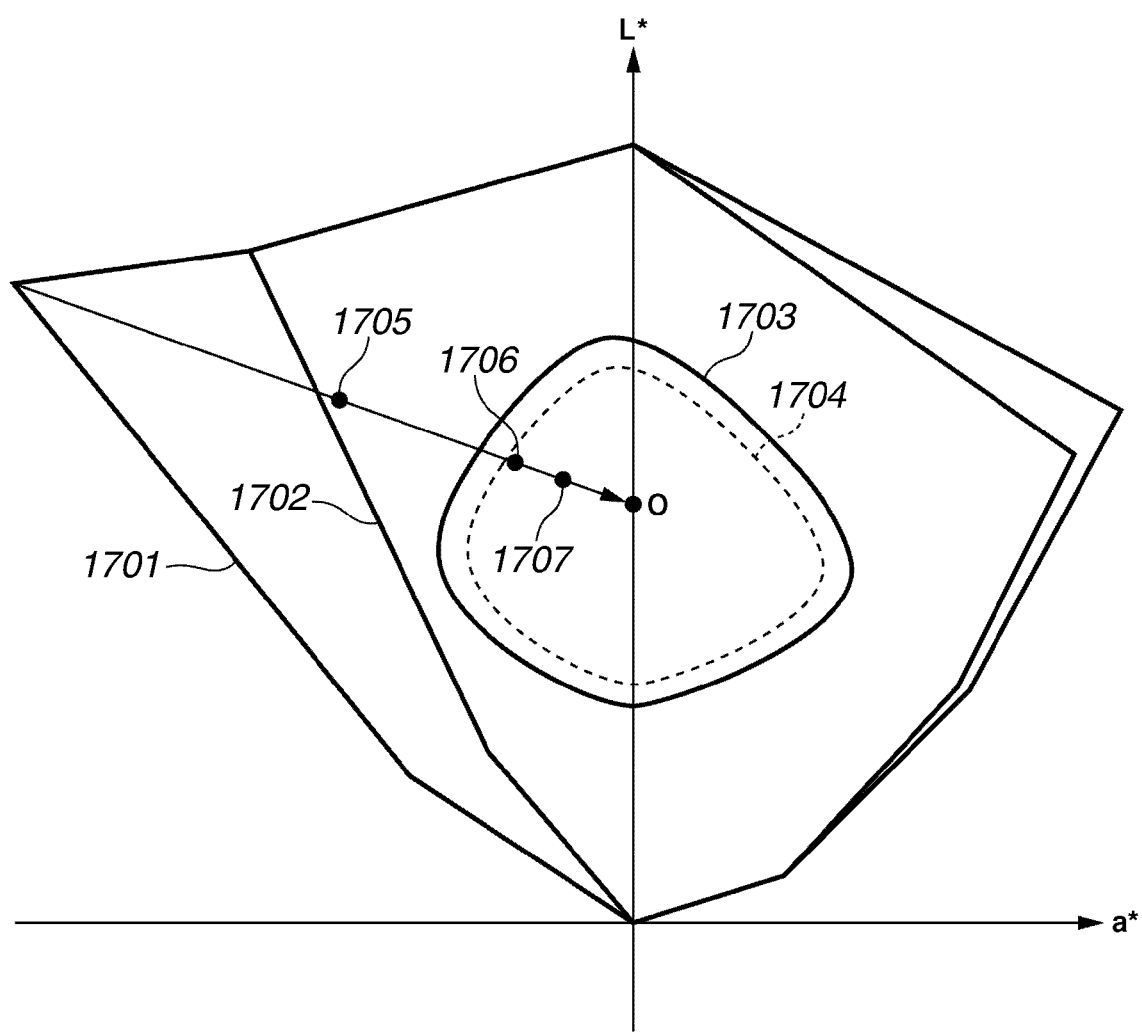
FIG. 13 is a diagram illustrating a standard color space, an input-estimated color gamut, and a printer color gamut of the plain paper according to the third exemplary embodiment of the present invention.

FIG. 13 is a diagram illustrating a standard color space 1701, an input-estimated color gamut 1702, and a printer color gamut in the case of the plain paper according to the third embodiment.

As illustrated in FIG. 13, within the printer color gamut in the case of the plain paper, a color gamut of a figure similar to the printer color gamut 1703 and having a volume of about ninety percent of the volume of the printer color gamut 1703 is taken as a prioritized color gamut 1704.

In relation to these color gamuts, a color 1705 in the standard color space, when compressed by the conventional method in which the gradation is maintained, for example, is compressed to the position of a point 1707.

On the other hand, in this embodiment, because the point 1705 is a color within the input-estimated color gamut 1702, the color is compressed to the position of a point 1706 within the prioritized color gamut 1704.

That is, according to this embodiment, the degradation of the saturation and the lightness caused due to the gamut compression is lessened and a good color reproduction can be implemented.

In addition, in the case where the paper having a wide color gamut such as the photograph paper is used, a color space wider than the sRGB color space, such as the Adobe RGB color space, can be taken as the input-estimated color gamut.

In addition, the size of the prioritized color gamut can be determined in accordance with the size of the printer color gamut.

For example, the case where a wide color space such as the Adobe RGB color space is taken as the input-estimated color gamut for each of the color gamuts of the plain paper and the photograph paper is described.

For example, if the prioritized color gamut is narrow, within the narrow color gamut such as the color gamut of the plain paper, the color in the input-estimated color gamut, which is frequently input, is reproduced in a low saturation and a somber color tint.

Therefore, it is effective to take a comparatively wide prioritized color gamut.

On the other hand, because the color gamut of the photograph paper is wide, the prioritized color gamut may be narrow in order to maintain the gradation of the colors outside the input-estimated color gamut.

This is because in the case of the photograph paper, the degradation of saturation occurs less compared to the plain paper. Thus, it is effective to determine the size of each color gamut with a consideration on the relationship between the size of the printer color gamut and the input-estimated color gamut.

Fourth Embodiment

In each of the embodiments as described above, the prioritized color gamut is determined to be of an even ratio of the distance from the compression destination point to the color gamut of the output device. However, the way of determining the prioritized color gamut is not limited to this.

That is, considering characteristics of the input-estimated color gamut, the ratio of the distance may be changed for each compression target point in the standard color space.

For example, suppose fewer inputs into a high chromatic part of the color of green are performed when the input-estimated color gamut is the sRGB color space.

In this case, a distance OPf from a compression target point O in the green region to the boundary of the prioritized color gamut is taken to be long and the region to which the color outside the input-estimated color gamut is compressed is taken to be narrow.

According to the above configuration, the color gamut in which the green color, which is actually frequently input and whose saturation is low, is reproduced is wide. This is effective for achieving the color reproduction with a good color gradation.

In addition, in reproducing a photograph, the color of the skin of a person is especially significant. Therefore, it is effective to take the distance OPf from the compression destination point O to the prioritized color gamut long near a hue of the color of the skin.

Thus, a region of the color of the skin in the wide region can be mapped to the prioritized color gamut. Thus, the color collapse and an extreme degradation of the saturation and the lightness can be lessened.

In addition, in each of the embodiments described above, the prioritized color gamut is determined based on the distance from the compression destination point to the color gamut of the output device. However, the way of determining the prioritized color gamut is not limited to this.

For example, the way of determining the prioritized color gamut may be such that the color gamut smaller than the color gamut of the output device and having a figure similar to the color gamut of the output device is provided, then the color gamut is taken as the prioritized color gamut. Then a point of intersection between the straight line extending from the compression destination point O to the compression target point and the outermost shell of the prioritized color gamut is found, and then the distance between the point of intersection and the point O is taken as the distance OPf.

Note that the color gamut indicating the prioritized color gamut is not limited to have the figure similar to the color gamut of the output device. That is, the color gamut may be appropriately deformed as long as the color gamut lies within the color gamut of the output device.

Thus, when the prioritized color gamut is taken as one definite color gamut, an image of the prioritized color gamut can be readily conceived, and thus the prioritized color gamut can be easily deformed.

Fifth Embodiment

In each of the embodiments described above, the output device is an inkjet printer and the input-estimated color gamut is the sRGB color space, for example.

Here, in the case where the output device is used only for printing an image photographed by a digital camera, it is effective to set the input-estimated color gamut to a color space dedicated to characteristics of the digital camera.

For example, because the color in the high chromatic part such as a primary color of green in the sRGB color space is not typically in an ordinary photographing scene, the color space obtained by removing the high chromatic part of the sRGB color space may be taken as the input-estimated color gamut.

As described above, the input-estimated color gamut is not limited to an existing color space. That is, the input-estimated color gamut may be appropriately set as the color space to which inputs are estimated to be performed.

In the compression by the gamut mapping as described in the first embodiment through the fourth embodiment, a reversal of a gradation change such as a reversal of a saturation change occurs in some cases.

Figure 14:
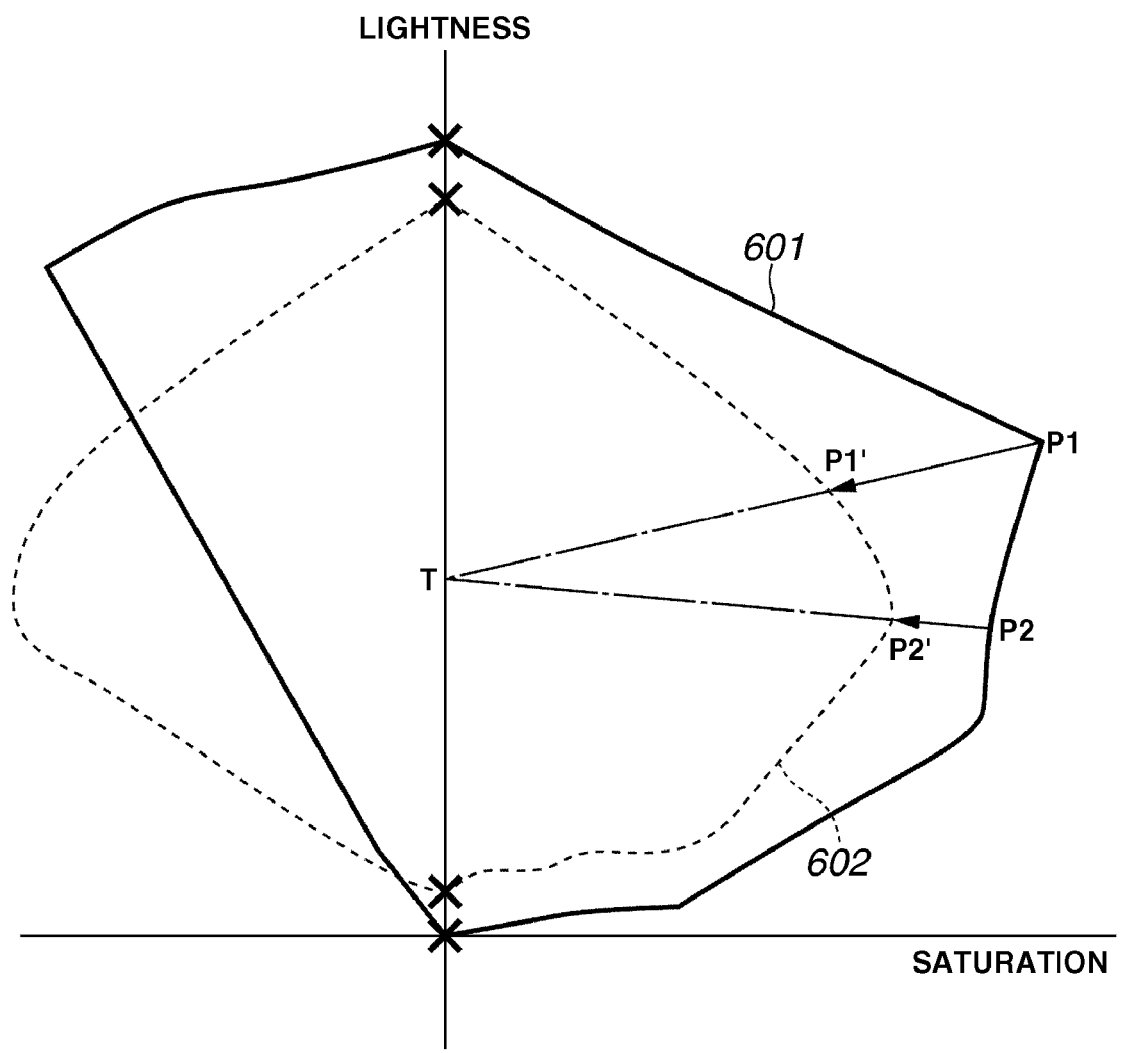
FIG. 14 is a diagram illustrating a relationship between the color gamut in the sRGB color space of a monitor and a printer color gamut.

That is, as illustrated in FIG. 14, the saturation is reduced from a point P1 to a point P2 in a standard color space 601. On the other hand, the saturation increases from a point P1' to a point P2' in a printer color gamut 602, which are the points obtained by mapping the points P1 and P2.

In this regard, in the fifth embodiment, in order to avoid the reversal of the saturation as described above, each color gamut is deformed, and then, the LUT is produced by the gamut mapping as described in each embodiment described above.

Figure 15:
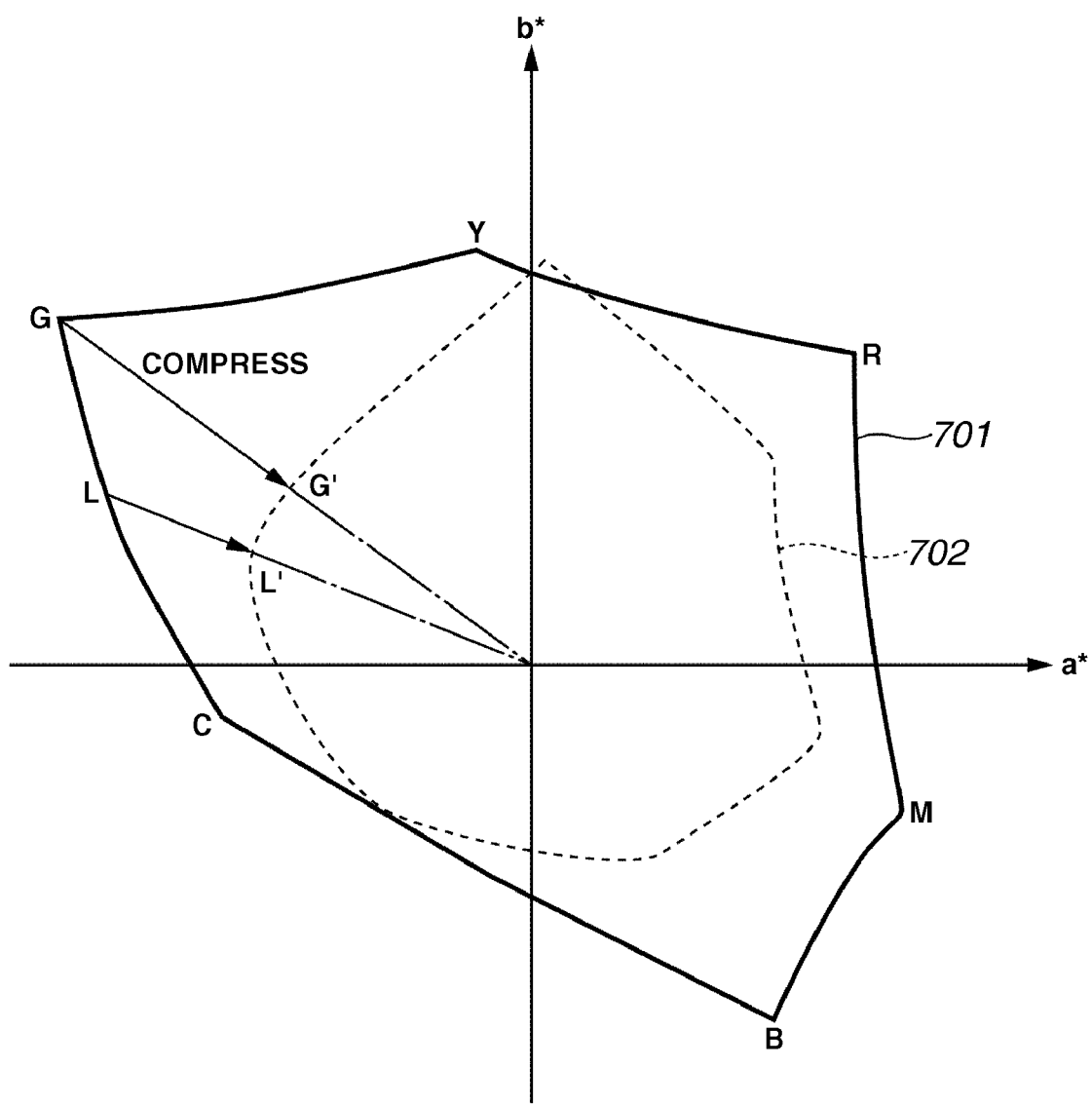
FIG. 15 is a diagram illustrating a reversal of a change in saturation in a direction of a hue angle that is solved by a fifth exemplary embodiment of the present invention.

FIG. 15 is a diagram illustrating the reversal of a saturation change in the direction of a hue angle.

As illustrated in FIG. 15, the hue of each of primary colors (R (red), G (green), B (blue), C (cyan), M (magenta), and Y (yellow)) is generally shifted between a standard color space 701 and a printer color gamut 702.

Here, focusing on a color G, which is the color of the hue of green (G), and a color L, which is obtained by changing the hue angle in the direction of the hue of the color C from the hue of the color of green, a compression mapping of each of the colors in the direction of an axis of the lightness is taken. In this case, the point (color) G is mapped to a point G' positioned on the boundary of the color gamut 702, and the point (color) L is mapped to a point L' positioned on the boundary of the color gamut 702 in the same way.

In this case, as is known from FIG. 15, the saturation change in the direction of the hue angel from the point G to the point L indicates a decrease, while the saturation change from the point G' to the point L' indicates an increase.

As described above, the saturation or the saturation change is reversed in the direction of the hue angle due to the compression mapping.

To address such drawback, as a first processing, a part of the printer color gamut is removed.

Figure 16:
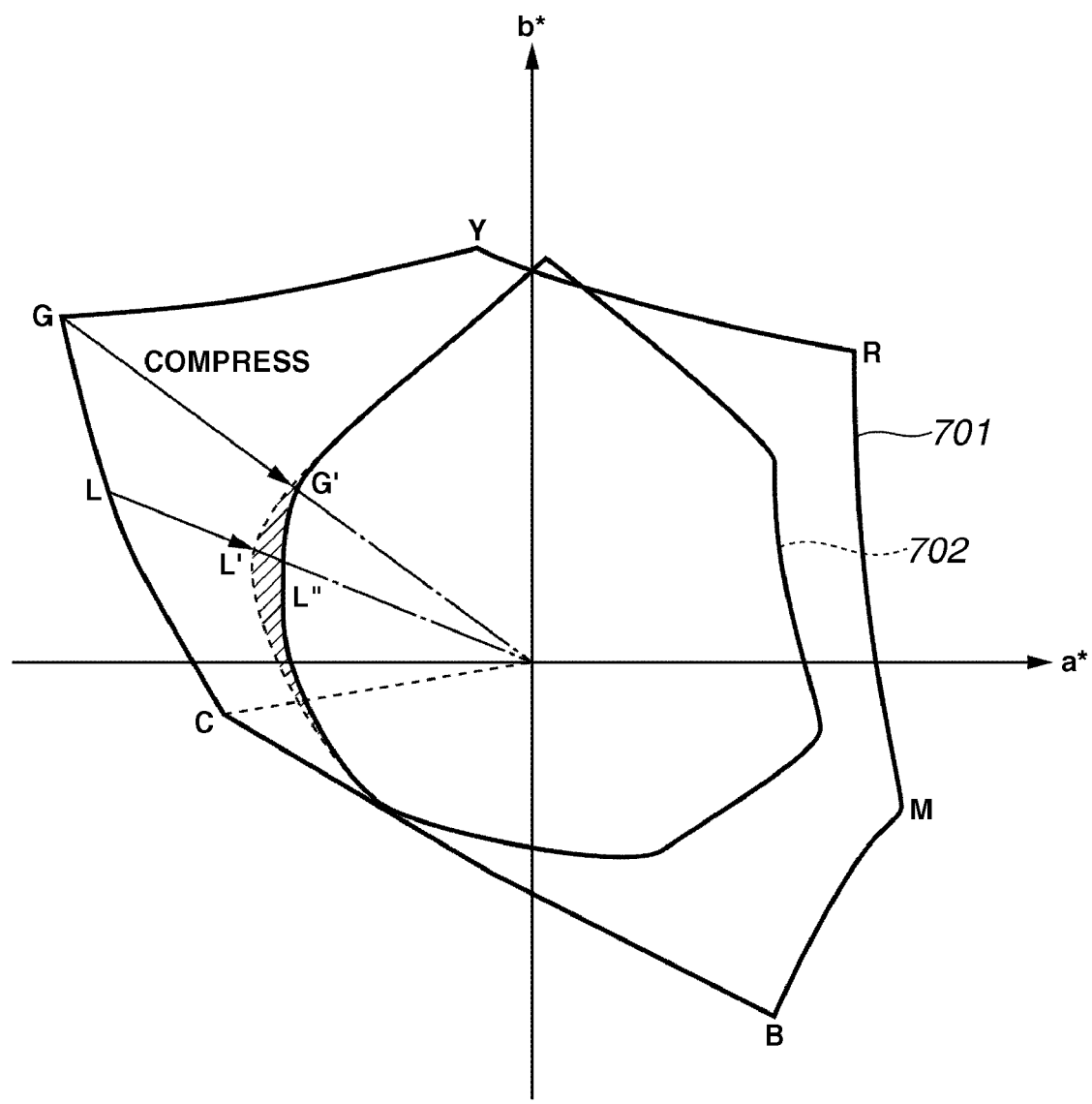
FIG. 16 is a diagram illustrating a removal of a part of the printer color gamut according to the fifth exemplary embodiment of the present invention.

FIG. 16 illustrates removal of a part of the printer color gamut.

As illustrated in FIG. 16, a shaded portion of the printer color gamut is removed.

Figure 17:
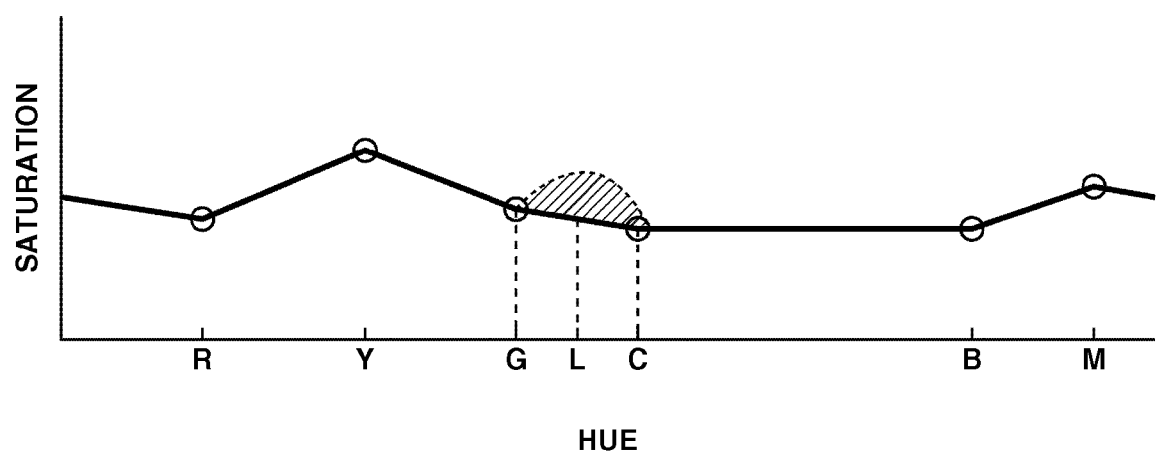
FIG. 17 is a diagram illustrating a saturation conversion curve in relation to the hue according to the fifth exemplary embodiment of the present invention.

This removal is, to describe in more detail, performed by providing a saturation conversion curve as shown in FIG. 17 per given lightness in relation to the hue and applying the saturation conversion curve to the grid point data that represents the printer color gamut.

That is, as shown in FIG. 17, a horizontal axis indicates the hue angle of the color gamut, and each of R, Y, G, C, B, and M indicates the primary color in the color gamut of a monitor or the hue thereof. A vertical axis indicates a maximum saturation of the printer color gamut at each hue angle.

In this embodiment, the saturation conversion curve is provided by plotting the points indicating the maximum saturation of each primary color with white circles (unfilled circles) and connecting the points by straight lines.

Then, a processing is performed such that the saturation conversion curve thus obtained is applied to each grid data as described above and the value of the saturation that the curve indicates is obtained by subtracting a portion that exceeds the saturation value that the curve indicates.

Thus, the color having the saturation higher than the saturation indicated by the line obtained by connecting the points of maximum saturation of each primary color (for example, a shaded portion with respect to the portion between the hues G and C) is removed, as shown in FIG. 17.

This processing is performed as per given lightness that is previously determined.

Thus, the color gamut is deformed so that the saturation of the standard color space 701 is decreased for the removed portion, and then the point L on the standard color space 701 is mapped to a point L".

As a result, in the printer color gamut 702, the characteristic of the portion between the point G' and the point L" indicates the same pattern as the characteristic of the gradation change from the point G to the point L in the standard color space 701. Thus, the reversal of the saturation change due to the compression mapping can be avoided.

Note that in the above example, a conversion definition defined by linearly connecting the maximum saturation points of the hue of each primary color is described. However, the conversion definition is not limited to this. That is, using a spline curve, a color gamut having higher continuity can be obtained.

Next, as a second processing in the fifth embodiment, a processing is performed such that the printer color gamut is deformed so as to transfer the color (point) of the maximum saturation of the printer color gamut to the color of the same hue as the hue of the point of the maximum saturation of the color gamut of the monitor.

As described with reference to FIG. 14, when the compression of the color gamut is performed toward one certain point, the reversal of saturation is likely to occur.

In this regard, in some cases, the reversal of saturation as shown in FIG. 14 is alleviated by the first processing described above by performing the "removal" so that the saturation of the printer color gamut becomes low.

However, by performing the second processing in the fifth embodiment, the reversal of saturation can surely be alleviated.

In addition, by performing the second processing, the amount to be removed by the first processing can be reduced so as not to cause the printer color gamut to be excessively small.

Thus, the degradation of the appearance of the output result by the printer due to the gamut mapping can be avoided.

Thus, how much the removal by the first processing is performed in relation to the deformation of the color gamut by the second processing can be set by considering all factors with respect to an image to be output such as degradation caused by the "removal" and the difference in the variance in the gradation in the direction of the hue.

Figure 18:
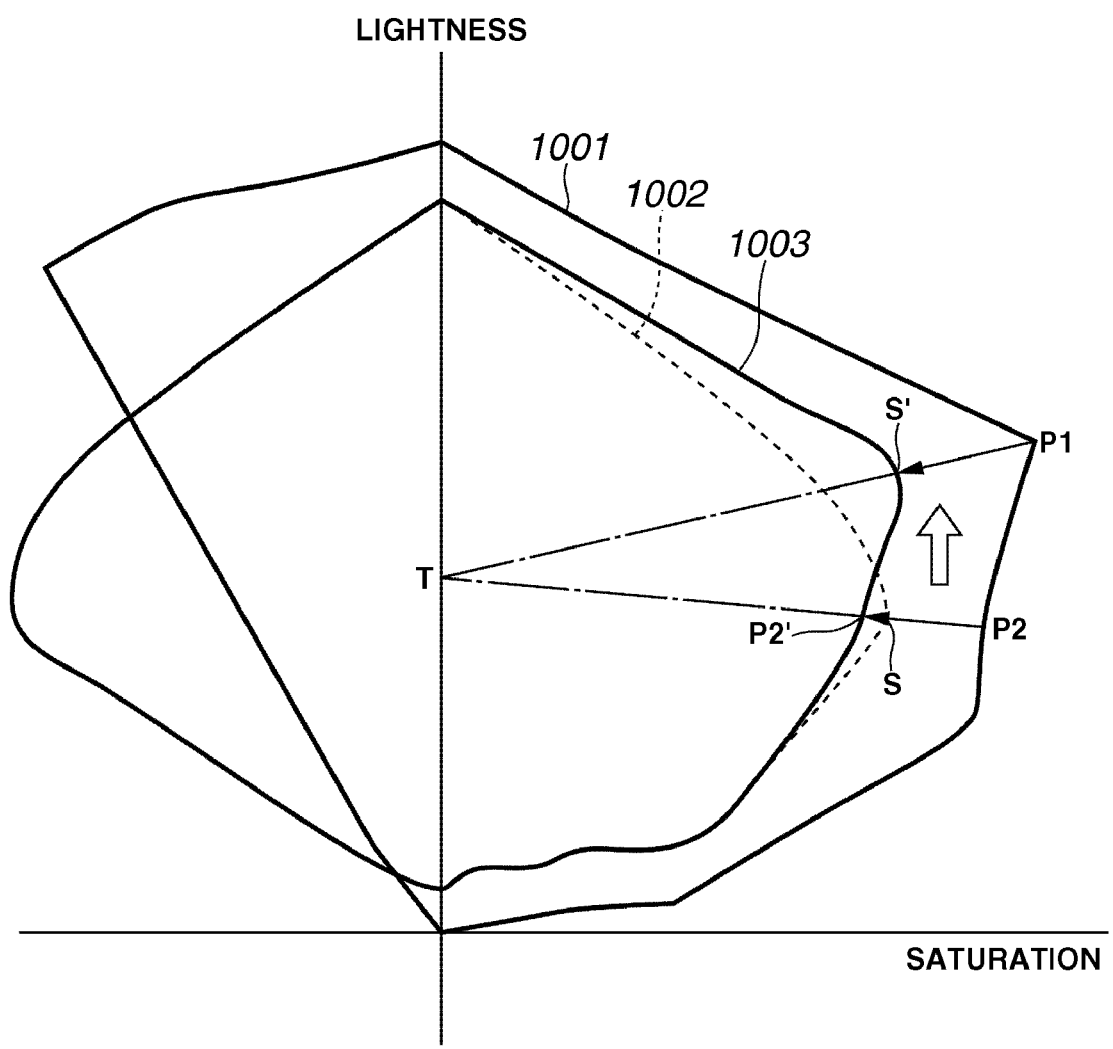
FIG. 18 is a diagram illustrating a color gamut deformation according to the fifth exemplary embodiment of the present invention.

FIG. 18 is a diagram illustrating the deformation of a color gamut by the second processing.

As illustrated in FIG. 18, the deformation of a color gamut is performed such that a maximum saturation point S in a printer color gamut 1002, which is indicated by a dotted line, is moved to a point S' positioned on a straight line connecting a convergence point T of the compression mapping and a maximum saturation point P1 in a standard color space 1001.

That is, the printer color gamut 1002 is deformed to a printer color gamut 1003 that is indicated by a solid line.

Thus, when the color that does not lie in the printer color gamut of the standard color space 1001 is subjected to the compression mapping toward the convergence point T, a color P1 of the maximum saturation in the standard color space 1001 is mapped to a color S' of the maximum saturation in the printer color gamut 1003.

As a result, when the saturation decreases from the point P1 to the point P2 in the standard color space 1001, the saturation also decreases from the point S' to the point P2' in the printer color gamut 1003. Thus, the reversal of saturation does not occur.

FIG. 19 is a diagram illustrating the deformation of a color gamut according to the fifth embodiment described above.

As illustrated in FIG. 19, in the fifth embodiment, the deformation for simply raising the lightness of each color is performed.

That is, the color having the lightness up to a lightness Ls of the maximum saturation point S of the printer color gamut 1002 is subjected to a linear conversion by a comparatively high ratio such that the lightness Ls is converted into a lightness Ls' of the maximum saturation point S' of the printer color gamut 1003.

In addition, the color of the lightness higher than the lightness Ls is subjected to a linear conversion by a ratio smaller than the above ratio.

The conversion as illustrated in FIG. 19 is also performed on the colors within the printer color gamut 1002 as well on to the boundary of the printer color gamut 1002.

As described above, according to the first to fifth embodiments, the color gamut of the output device can be effectively used. In addition, the color within the input-estimated color gamut can be reproduced well and the color outside the input-estimated color gamut can be surely reproduced.

Sixth Embodiment

As a device in which the input device and the output device are integrally configured, there is a device so-called a multi-function printer (hereinafter referred to as an "MFP device" or an "MFP").

The MFP includes an optical scanner unit and is provided with a function for reading an original image.

In addition, the MFP can print (copy) the read image by a printer unit equipped thereto and send and output the read image to another printer or a personal computer (PC) via a network.

Some MFPs can read various types of originals, namely, a reflection type original and a film original.

For the reflection type original, there are a printed original and a photographic original. For the film original, there are a negative film, a positive film, and a monochromatic film.

In addition, as an example of the printer unit, there is a printer unit that uses an inkjet recording system.

In addition, recently, there is an MFP that includes a liquid crystal screen. This type of MFP is provided with a function for displaying image data read by the optical scanner on the liquid crystal screen and a function for processing an image in the MFP and transferring the image data to a PC to allow the image to be displayed.

There is a type of such MFP that implements a color matching between devices having different color reproduction characteristics by using the CMS unique to the device as described above.

In this regard, the color reproduction range of the input device differs depending on the type of the device and the type of the original image, and thus, the size of the input-estimated color gamut differs in relation to the standard color space.

Images input to a multifunction printing device such as an MFP are supplied from different various sources. In this regard, the color reproduction range differs depending on the source of supply of the images or the type of the device.

In addition, there are many types of originals that are set to be read by the multifunction printing device such as an MFP.

In this regard, the color gamut of the input device differs depending on the type of a medium of the original.

For example, the color gamut of the negative film and the color gamut of the positive film differ from each other due to the difference in the characteristic of the films. Generally, the positive film has a wider color reproduction range for the high chromatic part.

In addition, the films such as a negative film and a positive film have a wider color reproduction range for the high chromatic part than an original for offset printing.

When various types of originals input by the input device are used, the sizes of the input-estimated color gamuts in relation to the standard color space are caused to differ from each other.

Especially for a multifunctional device such as MFP in which the input device and the output device are integrally configured, many types of originals are set to be read. Therefore, the size of the input-estimated color gamut is likely to differ depending on the type of an original.

Figure 1:
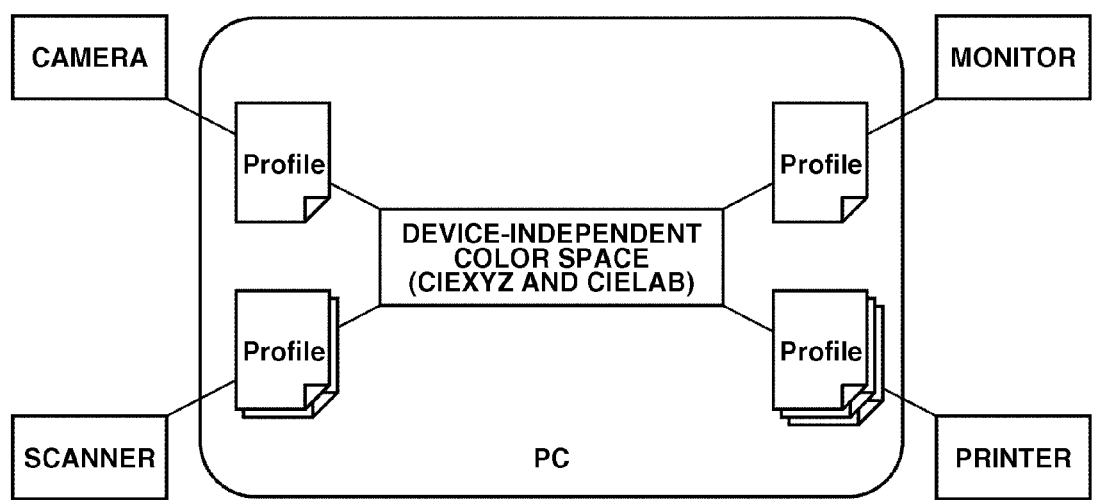
FIG. 1 is a diagram illustrating an outline of an exemplary configuration of a color management system.
Figure 2:
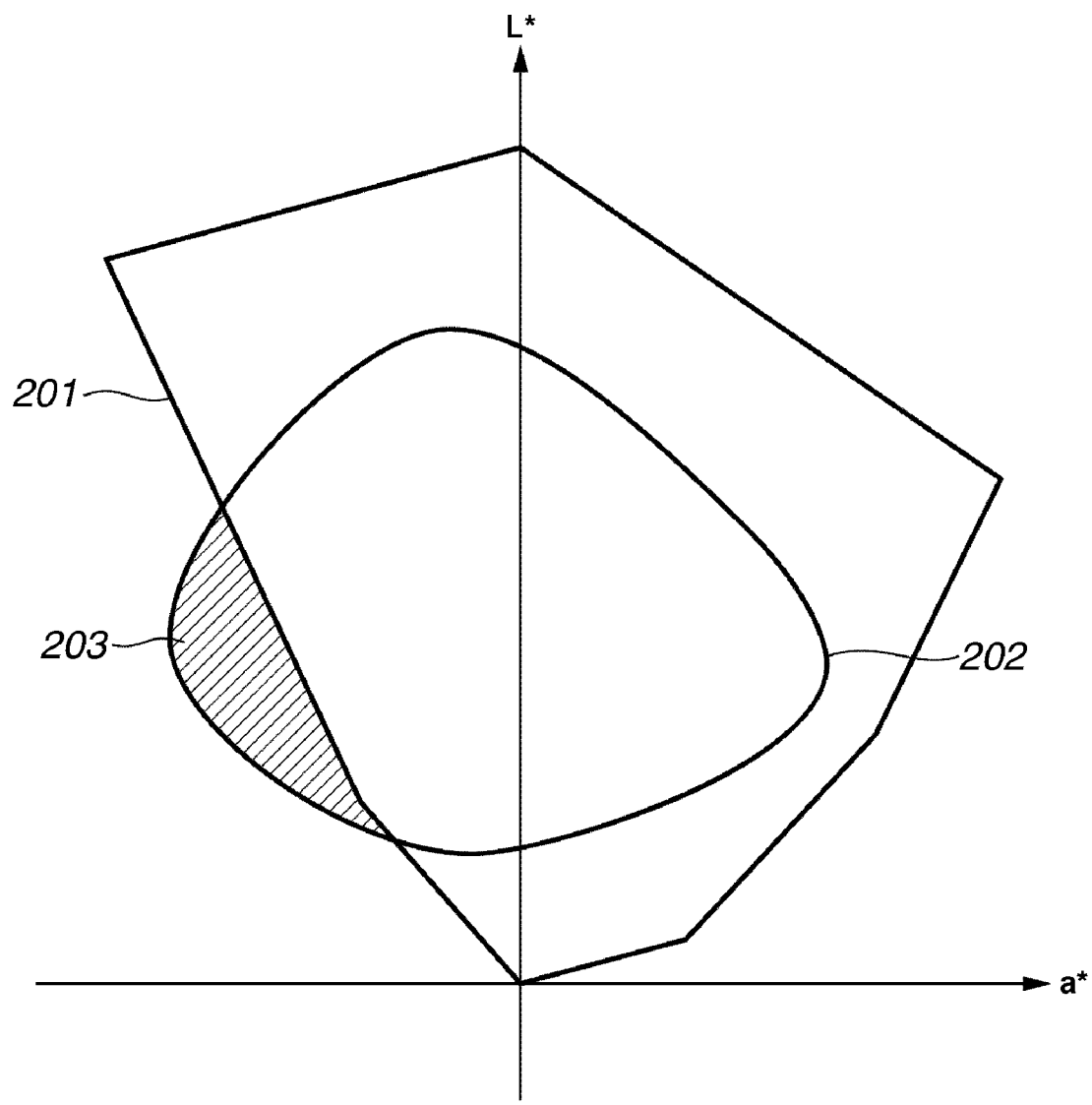
FIG. 2 is a diagram illustrating a case where in producing an LUT, which is a profile for an output device, a standard color space does not include the whole part of a color reproduction range of the output device.
Figure 3:
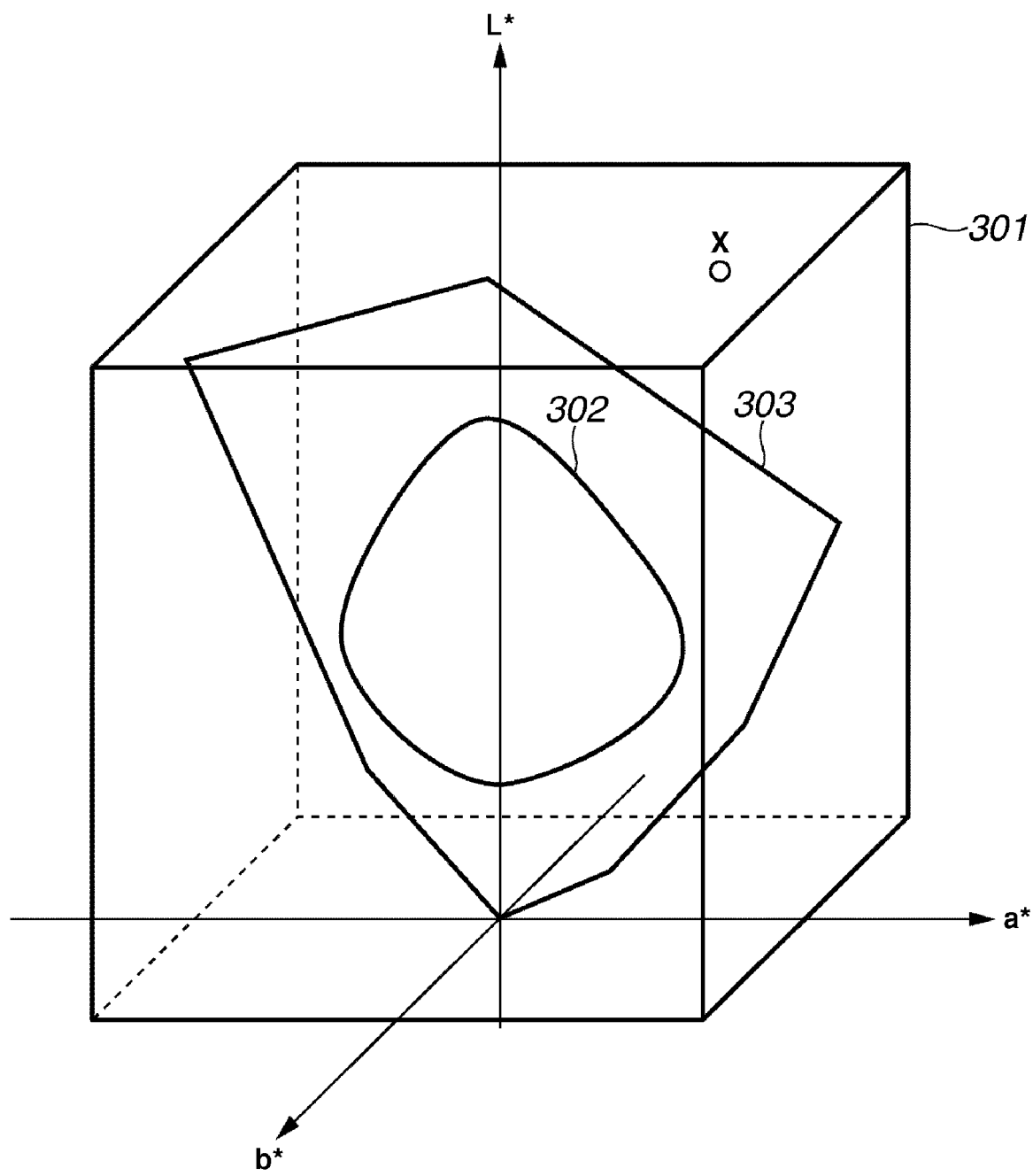
FIG. 3 is a diagram illustrating a relationship among a CIE-L*a*b* color space, a printer color gamut, and an input-estimated color gamut (sRGB color space).

Referring to FIG. 3, the range of the input-estimated color gamut 303 differs depending on the type of an original.

In addition, in some cases, because of the difference in the input-estimated color gamut 303, the color X in the L*a*b* color space, which is a color outside the input-estimated color gamut 303 with respect to a given original as shown in FIG. 3, can be a point within the input-estimated color gamut 303 with respect to another type of original.

In this case, when the same compression definition (method) is used for the two different types of originals, an output image is not so much affected in the case of the given original. On the other hand, in the case of the other type of original, the gradation in the peripheral portion of the output image is sometimes inappropriately reproduced, and, therefore, a good color reproduction cannot be implemented.

In addition, in the case of copying, if a part of the original is positioned offscreen by an inappropriate placing on the screen, the reproduced color differs from the case where the original is appropriately placed onto the screen of the device.

In addition, image characteristics of the original need to be subjected to analysis for each different type of original. Therefore, there are comparatively serious problems in the packaging such that the load on the device is high, the costs of manufacturing increase, and the speed of copying becomes low.

The sixth embodiment is described in detail next with reference to FIG. 20A, FIG. 20B, and FIGS. 21 through 26.

Figure 20A:
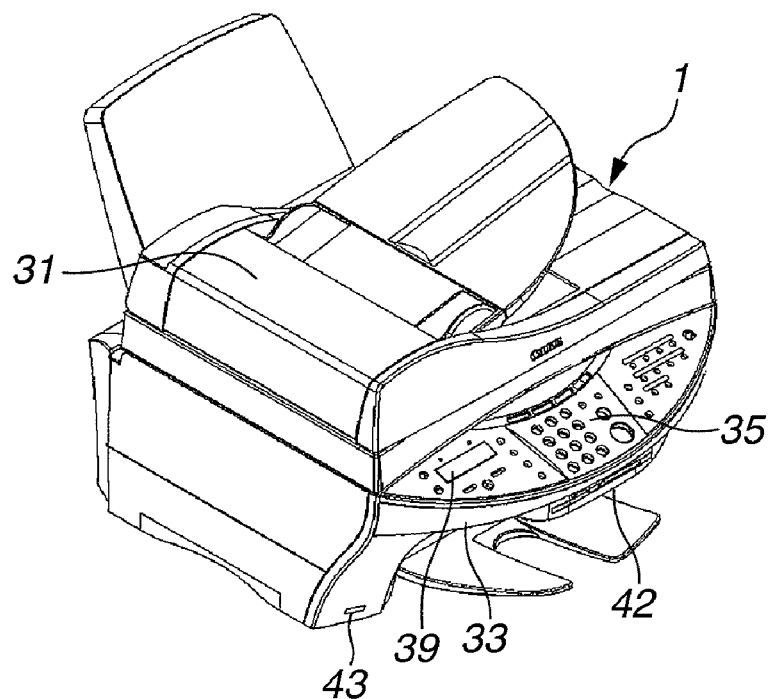
FIG. 20A and FIG. 20B are perspective diagrams illustrating a multifunction peripheral (MFP) according to a sixth exemplary embodiment of the present invention.
Figure 20B:
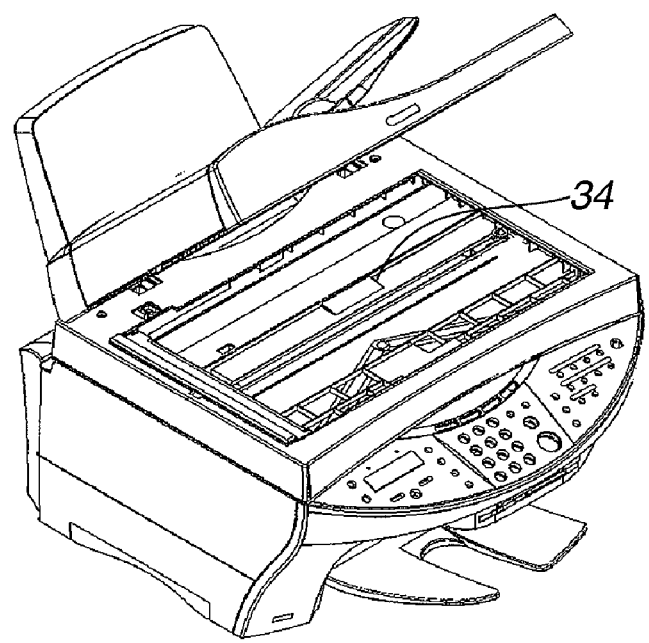

FIG. 20A and FIG. 20B illustrate an MFP 1 according to the sixth embodiment. FIG. 20A is a diagram showing the MFP 1 in a state in which an original table cover having an auto document feeder (hereinafter referred to as an "ADF") 31 integrated therewith is closed. FIG. 20B is a diagram showing the MFP 1 in a state in which the cover is opened.

The MFP 1 according to this embodiment is provided with a function of an ordinary PC printer that receives data from a host computer (PC) and prints the received data and a function of a scanner, as well.

In addition, the MFP 1 is provided with, as functions that are implemented by the MFP itself, a copying function for printing an image read by the scanner unit by the printer unit and a function for directly reading and printing an image stored in a storage medium such as a memory card. In addition, the MFP is provided with a function for receiving an image sent from a digital camera and printing the received image.

The MFP 1 includes a reading (scanner) unit 34 such as a flatbed scanner, a printing (printer) unit 33 that uses the inkjet system, a display panel 39, and an operation panel 35 having various keys and switches.

In addition, the MFP 1 includes a universal serial bus (USB) port (not shown) for communication with a PC on the back of the MFP 1. The MFP 1 performs communication with the PC through the USB port.

The MFP 1 also includes a card slot 42 for reading data from various types of memory card and a camera port 43 for data communication with a digital camera. The MFP 1 also includes the ADF 31 for automatically setting an original onto the original table.

Figure 21:
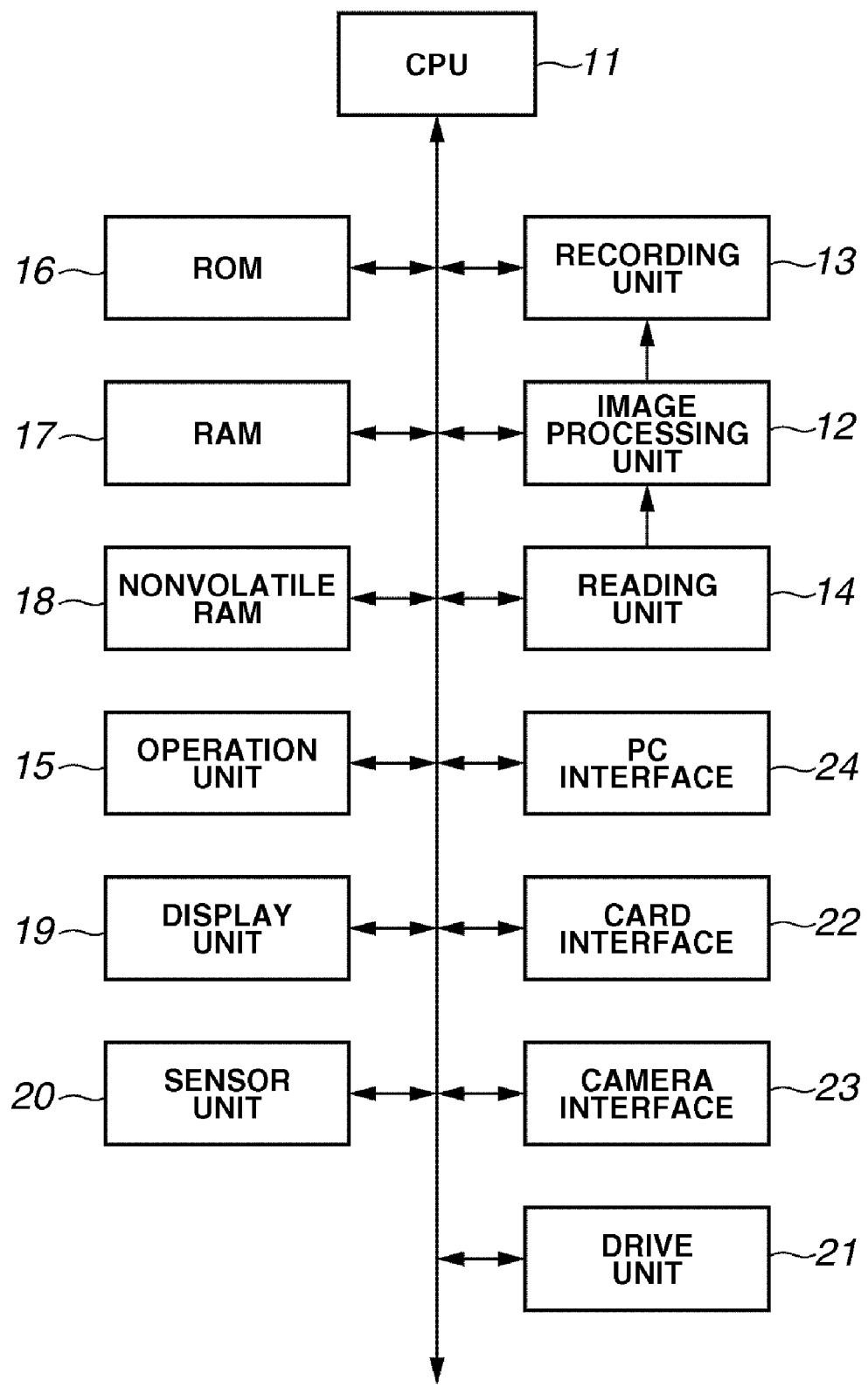
FIG. 21 is a block diagram illustrating a control configuration of the MFP illustrated in FIG. 20A and FIG. 20B.

FIG. 21 is a block diagram illustrating a control configuration of the MFP 1.

Referring to FIG. 21, a central processing unit (CPU) 11 controls various functions provided to the MFP 1. In addition, the CPU 11 executes a program for processing an image that is stored in a read-only memory (ROM) 16, in response to a given operation performed via an operation unit 15.

A reading unit 14 includes a charge-coupled device (CCD). The reading unit 14 is equivalent to the reading unit 34 shown in FIG. 20B. The reading unit 14 reads an original image and outputs analog luminance data of red (R), green (G), and blue (B).

Note that the reading unit 14 may include a contact type image sensor (CIS) instead of a CCD. The reading unit 14 can continuously read order sheets by using the ADF 31, shown in FIG. 20A.

A card interface 22 is equivalent to the card slot 42 shown in FIG. 20A.

The card interface 22 reads image data photographed by a digital still camera (hereinafter referred to as a "DSC"), for example, and recorded on a memory card, in response to a given operation via the operation unit 15.

The color space of image data read via the card interface 22 is converted from the color space of the DSC (for example, YCbCr) to the standard RGB color space (for example, NTSC-RGB or sRGB).

In addition, the image data read based on header information thereof is subjected to various processing for use in applications such as conversion of resolution to an effective pixel number.

A camera interface 23 is equivalent to the camera port 43 shown in FIG. 20A. The camera interface 23 is an interface for directly connecting to the DSC to read image data.

An image processing unit 12 performs image processing such as image analysis, conversion of a color gamut, conversion from luminance signals (RGB) to density signals (CMYK), scaling, gamma conversion, and error distribution, which are to be described later below. Resulting print data is stored in a random access memory (RAM) 17.

The print data that is stored in the RAM 17 is sent to a recording unit 13, which is equivalent to the printing unit 33 shown in FIG. 20A, in a given amount per one time of sending. Then, the print data sent to the recording unit 13 is recorded.

A non-volatile RAM 18 is, for example, a battery backup static RAM (SRAM). The non-volatile RAM 18 stores data unique to the MFP 1.

The operation unit 15 is equivalent to the operation panel 35 shown in FIG. 20A.

In exemplary embodiments, the operation unit 15 includes a print start key, a key for printing the order sheet, a key for reading the order sheet, and a copy start key used in a monochromatic copy mode and in a color copy mode. By using the keys, the image data stored in the storage medium is selected and the recording starts.

In addition, in exemplary embodiments, the operation unit 15 includes a mode key for specifying a mode of a copying resolution and an image quality, a stop key for stopping a copying operation, numeral keys for inputting a number of copies to make, and a registration key.

The CPU 11 determines whether the keys are pressed, and controls each unit in accordance with the result of the determination.

A display unit 19 is equivalent to the display panel 39 shown in FIG. 20A. The display unit 19 includes a dot-matrix type liquid crystal display (LCD) unit and an LCD driver. The display unit 19 performs various displays in accordance with the control by the CPU 11.

In addition, the display unit 19 can display a thumbnail image of the image data stored in the storage medium. The recording unit 13 is equivalent to the printing unit 33 shown in FIG. 20A. The recording unit 13 includes a mechanism unit having an inkjet recording head and a control unit such as a versatile integrated circuit (IC).

The recording unit 13 prints out the image data based on the recorded data that is read from the RAM 17 by the control by the CPU 11.

A drive unit 21 configures an operating mechanism for the reading unit 14 and the recording unit 13 described above.

The drive unit 21 includes a stepping motor for driving a paper feed roller and a paper discharge roller, a gear for transmitting a drive force of the stepping motor, and a driver circuit that controls the stepping motor.

A sensor unit 20 includes a sensor for detecting the width of a recording paper sheet, a sensor for determining the presence or absence of a recording paper sheet, a sensor for determining the width of an original, a sensor for determining the presence or absence of an original, and a sensor for detecting a recording medium.

The CPU 11 determines the state of an original and a recording paper sheet based on information obtained from the sensors.

A PC interface 24 is an interface of the MFP 1 to a PC. The MFP 1 receives an instruction from the PC via the PC interface 24 to perform an operation such as printing and scanning.

In the above configuration, for example, when a user instructs to start the copying operation via the operation unit 15, the reading unit 14 reads an original placed on the original table.

Then, the read data is sent to the image processing unit 12 and is subjected to an image processing to be described later below. Then, the data is sent to the recording unit 13 and is printed.

Figure 22:
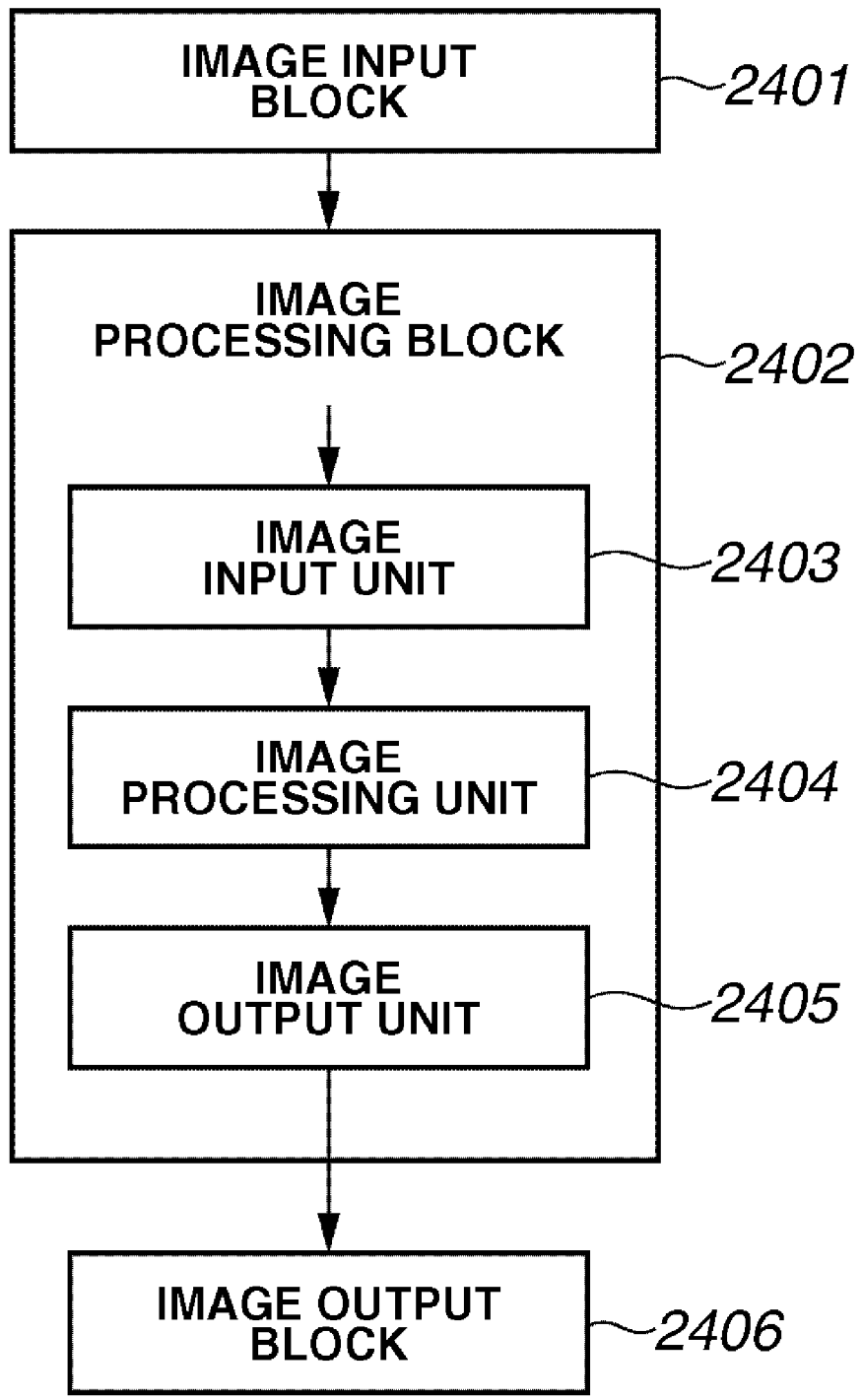
FIG. 22 is a block diagram illustrating a configuration of an image processing system according to the sixth exemplary embodiment of the present invention.

FIG. 22 is a block diagram illustrating an overview of an exemplary configuration of an image processing system of the MFP 1 illustrated in FIG. 20A, FIG. 20B, and FIG. 21.

An image input block 2401 is an image supplying unit of the MFP 1. The image input block 2401 includes an interface with the scanner, an interface with the digital camera by using a USB cable, an interface used in the case of a camera direct print, an interface with the memory card, and an interface used in the case of an infrared communication with a personal digital assistant.

In an image processing block 2402, an image input unit 2403 receives image data sent from the image input block 2401.

An image processing unit 2404 performs a given image processing such as gamut mapping using the LUT as described in each embodiment to be described below to the image data to produce print data.

An image output unit 2405 outputs the resulting print data to an image output block 2406.

The image output block 2406 may be, for example, a printing unit or a liquid crystal monitor.

In addition, the LUT as described in each embodiment to be described below can be produced by the MFP 1 or a PC.

In addition, the LUT thus produced can be stored in a given memory of the MFP 1, the PC, or the printer when the LUT is used.

Figure 23:
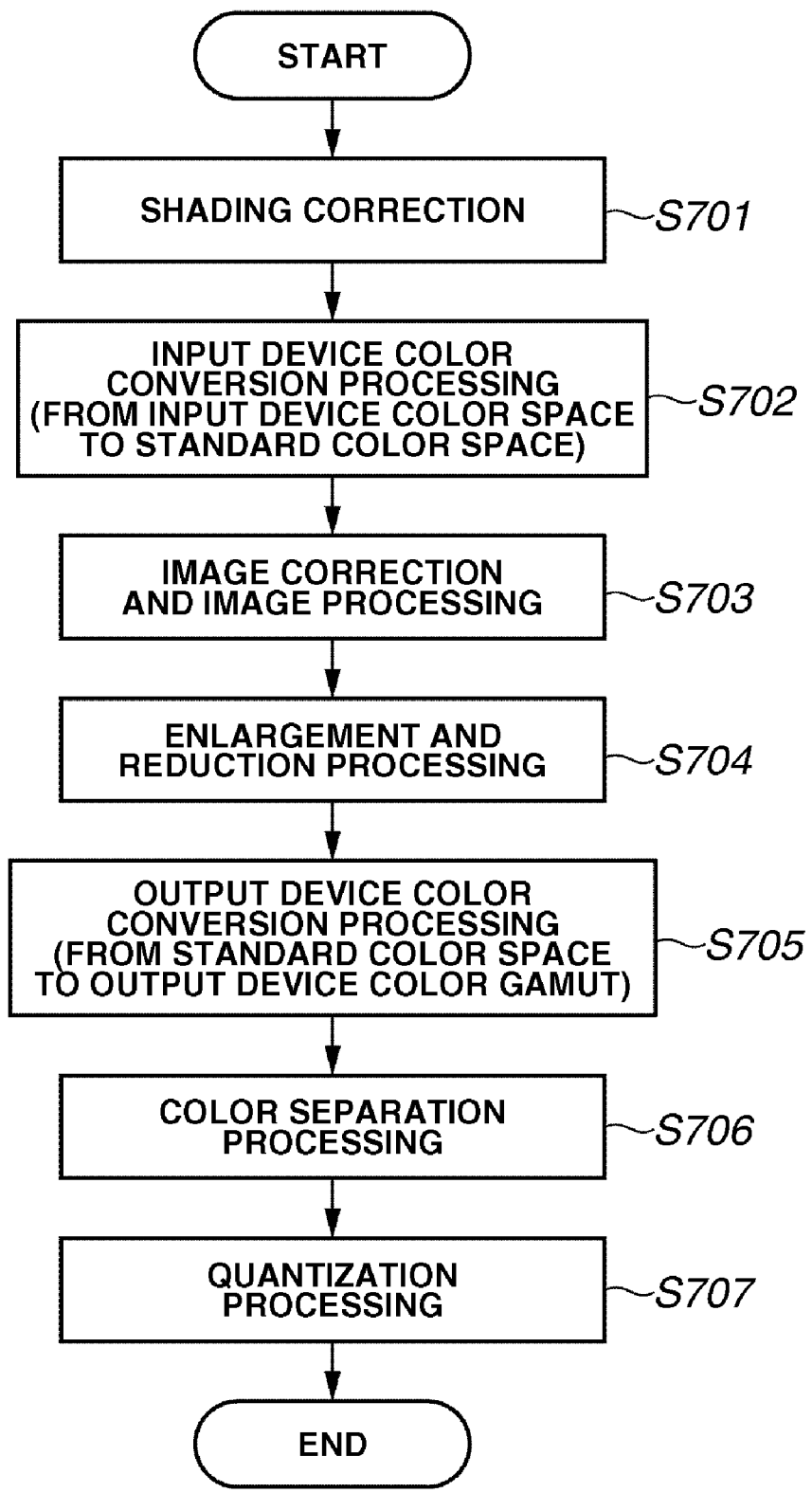
FIG. 23 is a flow chart illustrating processing that is performed by an image processing block shown in FIG. 22.

FIG. 23 is a flow chart of exemplary processing performed by the image processing block 2402 shown in FIG. 22.

First, in step S701, a shading correction of the image data input by the image input unit 2403 is performed.

In the shading correction processing, unevenness of an image pickup element of the scanner is corrected with respect to input image data that is read by the reading unit 14 and subjected to an analog-to-digital (A/D) conversion.

Next, in step S702, an input device color conversion is performed. By the input device color conversion, the image data unique to the input device is converted into the data of the standard color space such as the sRGB that is defined by the International Electrotechnical Commission (IEC) or the Adobe RGB that is advocated by Adobe Systems, Inc.

For a method of conversion of the image data to the data of the standard color space, a computation method using a matrix such as 3×3 and 3×9 and a lookup table method in which a table describing a conversion rule is referred to and the method of computation is determined based on the conversion rule may be used.

The converted data is subjected to a correction processing and an image processing in step S703. In the correction processing and the image processing performed in step S703, an edge enhancement processing for correcting unsharpness occurring in the course of reading an image, a character processing for improving readability of characters, and a processing for eliminating rear side image copying occurring in the course of reading by irradiation of light can be performed.

Then, in step S704, an enlargement and reduction processing is performed. In the enlargement and reduction processing, the image data is converted into a magnification desired by the user when the user performs a specification for magnification and in the case of a layout copying in which two originals are allocated on one paper. For the method of conversion in the enlargement and reduction processing, a common method such as a bicubic method and a nearest neighbor method may be used.

In step S705, the image data in the standard color space is converted into the image data unique to the output device. In this manner and by the processing in step S702, the input device color gamut is mapped to the output device color gamut via the standard color space. The gamut mapping in step S705 is performed by the processing that uses the lookup table (hereinafter simply referred to as the "LUT") to be described in each embodiment below or by the processing in which a computation is added to the processing that uses the lookup table.

Then, in step S706, a color separation processing is performed. That is, the image data of the RGB signals obtained in step S705 is converted into the image data of color material signals that are used by the printing unit of the MFP 1. More specifically, the image data of RGB signals is converted into the data of the ink colors of cyan, magenta, yellow, and black that are used by the inkjet printing unit. The conversion processing is performed by also using the LUT for color separation.

Finally, in step S707, a quantization processing to a level that can be recorded by the printing unit is performed. More Specifically, the data is converted into binary data of "ink discharge" and "no ink discharge". This conversion can be performed by a publicly known method of quantization such as error distribution.

In this manner, the data is converted into the data of a format with which the printing unit can record the data. The recording operation is performed based on the converted data to form an image.

In the sixth embodiment and in a seventh to tenth embodiments described below, description is made as to the LUT used in the gamut mapping in step S705 described above, the method of producing the LUT, and the method of using the LUT.

The color spaces as used in the sixth embodiment and in the seventh to tenth embodiments described below are handled in the CIE-L*a*b* color system. Note that the processing of these embodiments is not limited to the method using the CIE-L*a*b* color system. That is, the color space similar to the CIE-L*a*b* color system such as L*u*v* color space may be used.

In the color gamut conversion according to the sixth embodiment, an input-estimated color gamut is determined in accordance with the type of original that is set to the scanner unit as an input device, and the method of compression to a printer color gamut differs between the color within the input-estimated color gamut and the color outside the input-estimated color gamut.

The flow chart of the processing for producing the LUT used in the color gamut conversion according to the sixth embodiment is similar to the flow chart that is described in the first embodiment, and, therefore, the description thereof is not repeated here.

In this embodiment, the LUT related to the gamut mapping as described above is provided for each type of original that the scanner unit reads so as to use the LUT by selecting the LUT in accordance with the type of the original.

Figure 24:
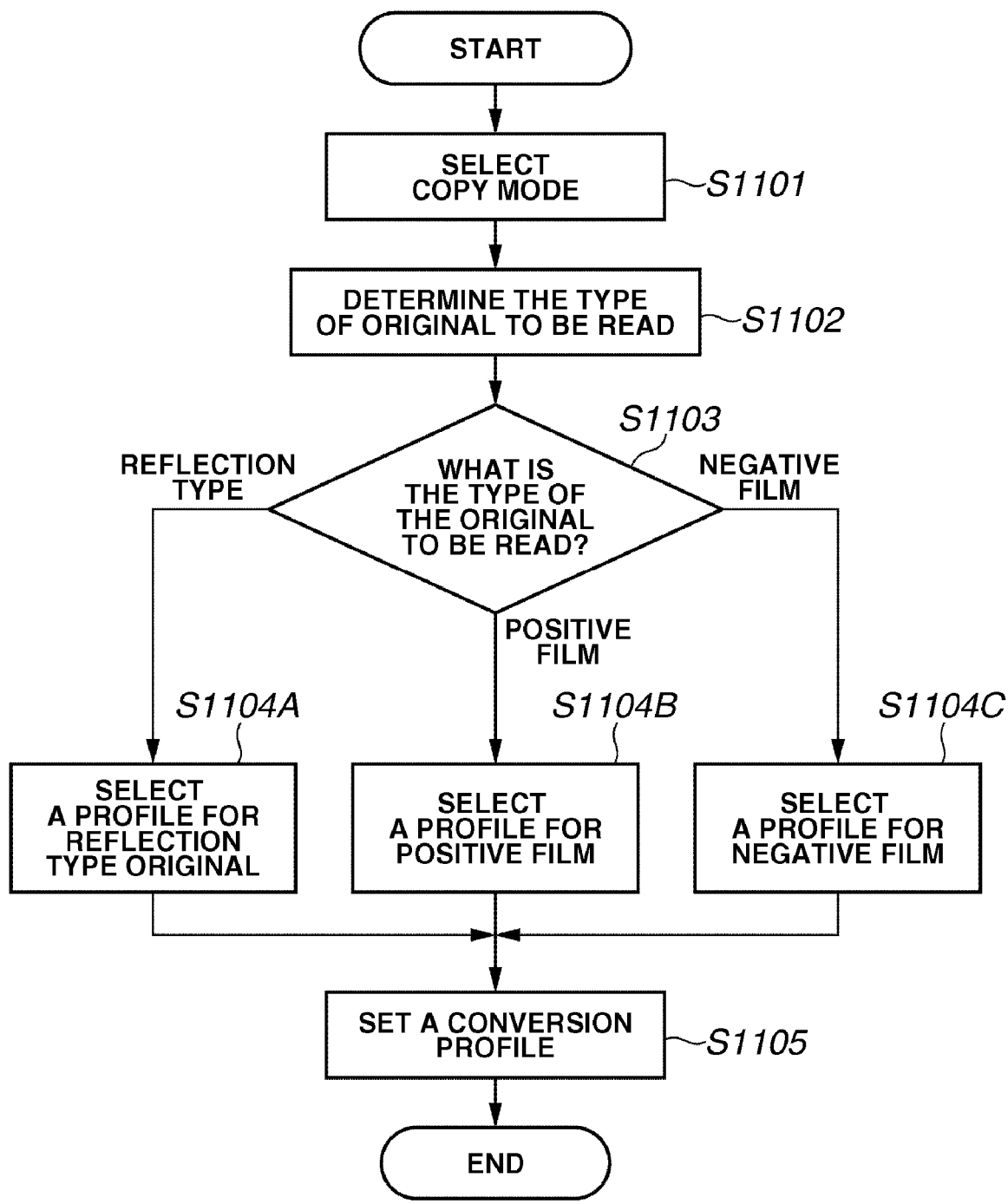
FIG. 24 is a flow chart illustrating a method of selecting a color conversion LUT according to the sixth exemplary embodiment of the present invention.

FIG. 24 is a flow chart of the processing for selecting and setting a profile (LUT) for the output device color conversion according to this embodiment.

First, in step S1101, it is determined that the user sets the copy mode. The setting of the copy mode by the user includes items related to the input device such as the type of original to be copied, the quality in reading, and the size of the original.

In addition, the setting of the copy mode by the user includes items related to the output device such as the quality for outputting, the type of paper, and the size of paper.

In addition, the setting of the copy mode by the user also includes various items such as adjustment values for adjusting an image. The user performs the setting of the copy mode via a main body panel user interface.

Then, in step S1102, the type of original that is to be read is determined based on the result of determination as to the selection of the copy mode. Then in step S1103, the type of the determined original is determined so that processing can be performed based on the determined type of the original.

Then, in accordance with the result of the determination in step S1103, the conversion profile (LUT) is selected in step S1104A, step S1104B, or step S1104C. More specifically, in the exemplary embodiment shown in FIG. 24, if the type of the original is a reflection type, the profile is set to a profile for a reflection type original in step S1104A, if the type of the original is a positive file type, the profile is set to a profile for a positive film type original in step S1104B, and if the type of the original is a negative film type, the profile is set to a profile for a negative film type original in step S1104C.

Then, in step S1105, the selected conversion profile is set to a processing unit that performs the gamut mapping in step S705 shown in FIG. 23.

The series of processings described above need be completed before the actual image processing is performed.

The LUT for the selected profile is produced by the method described in the first embodiment.

Figure 25:
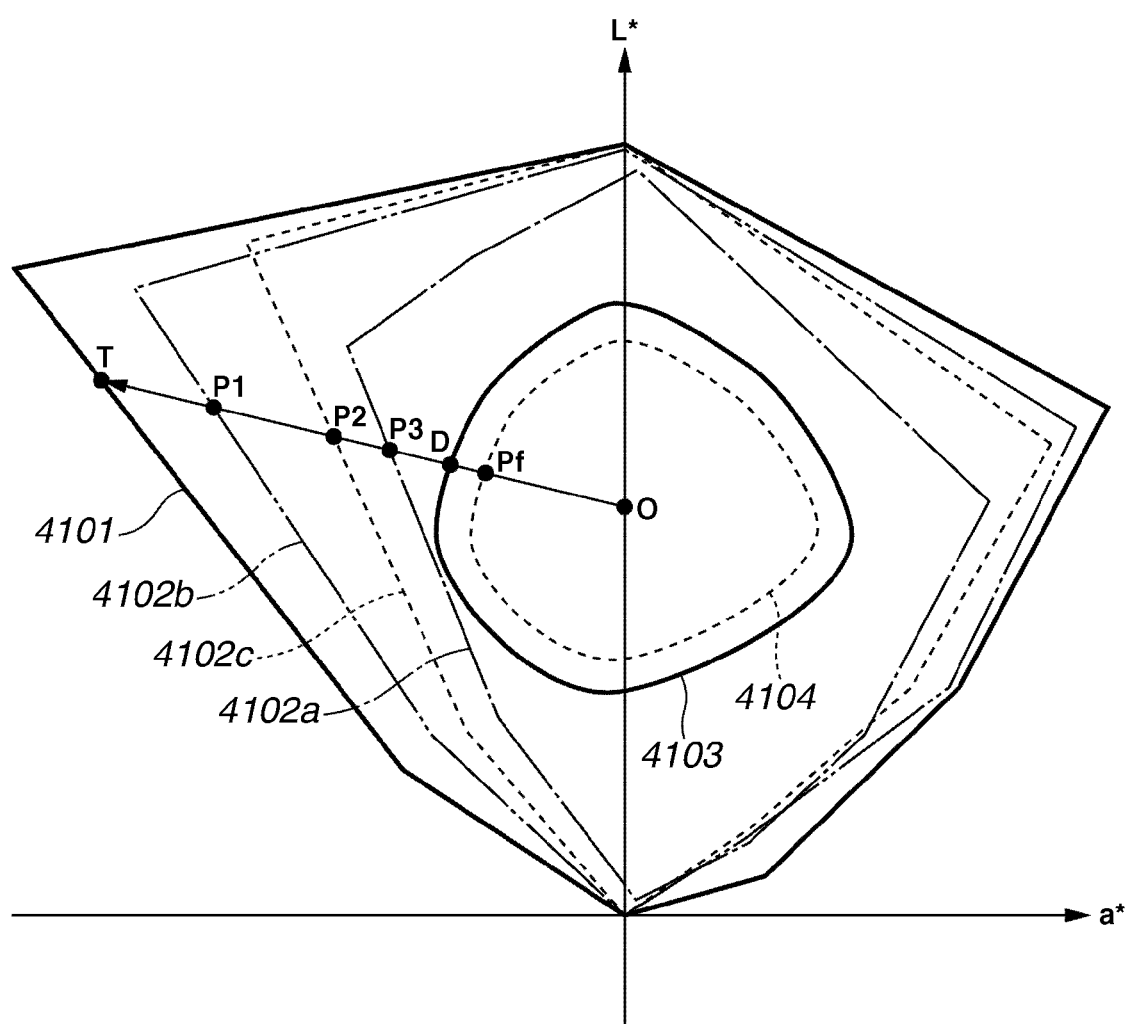
FIG. 25 is a diagram illustrating a standard color space, an input-estimated color spaces, a printer color gamut, etc., which are defined by the LUT produced related to the selection of the LUT.

FIG. 25 is a diagram illustrating a relationship of the color reproduction range similar to that shown in FIG. 7.

FIG. 25 illustrates a standard color space 4101, input-estimated color spaces 4102a, 4102b, and 4102c, an output unit color reproduction range 4103, and a prioritized color gamut 4104.

The input-estimated color spaces 4102a through 4102c correspond to the profiles selected in steps S1104A through S1104C shown in FIG. 24, respectively.

The color gamut 4102a is a color gamut to which a signal that is obtained when the positive film original is read by the scanner unit of the MFP 1 is estimated to be input.

In the same manner, the color gamut 4102b is a color gamut to which a signal that is obtained when the negative film original is read is estimated to be input, and the color gamut 4102c is a color gamut to which a signal that is obtained when the reflection type original is read is estimated to be input.

Thus, in the sixth embodiment, in producing the LUT as shown in FIG. 6, the input-estimated color space is determined in accordance with the type of original to be read to produce a different LUT for each type of original.

That is, in FIG. 25, the compression is performed in a direction along a straight line that connects a point (color) O positioned on the lightness axis, which is determined to be the compression destination point, and a color that is the compression target grid point.

Here, consider a line that connects a point (color) T positioned at an outermost shell of the standard color space 4101 and the point O.

Here, a point P1 is a point positioned at the outermost shell of the color gamut 4102b on the line TO. Likewise, a point P2 is a point positioned at the outermost shell of the color gamut 4102c on the line TO, and a point P3 is a point positioned at the outermost shell of the color gamut 4102a on the line TO.

In addition, a point D is an outermost shell point of the color gamut 4103 of the printing unit, and a point Pf is positioned on the boundary of the prioritized color gamut 4104 within the color gamut 4103 of the printing unit.

Figure 26:
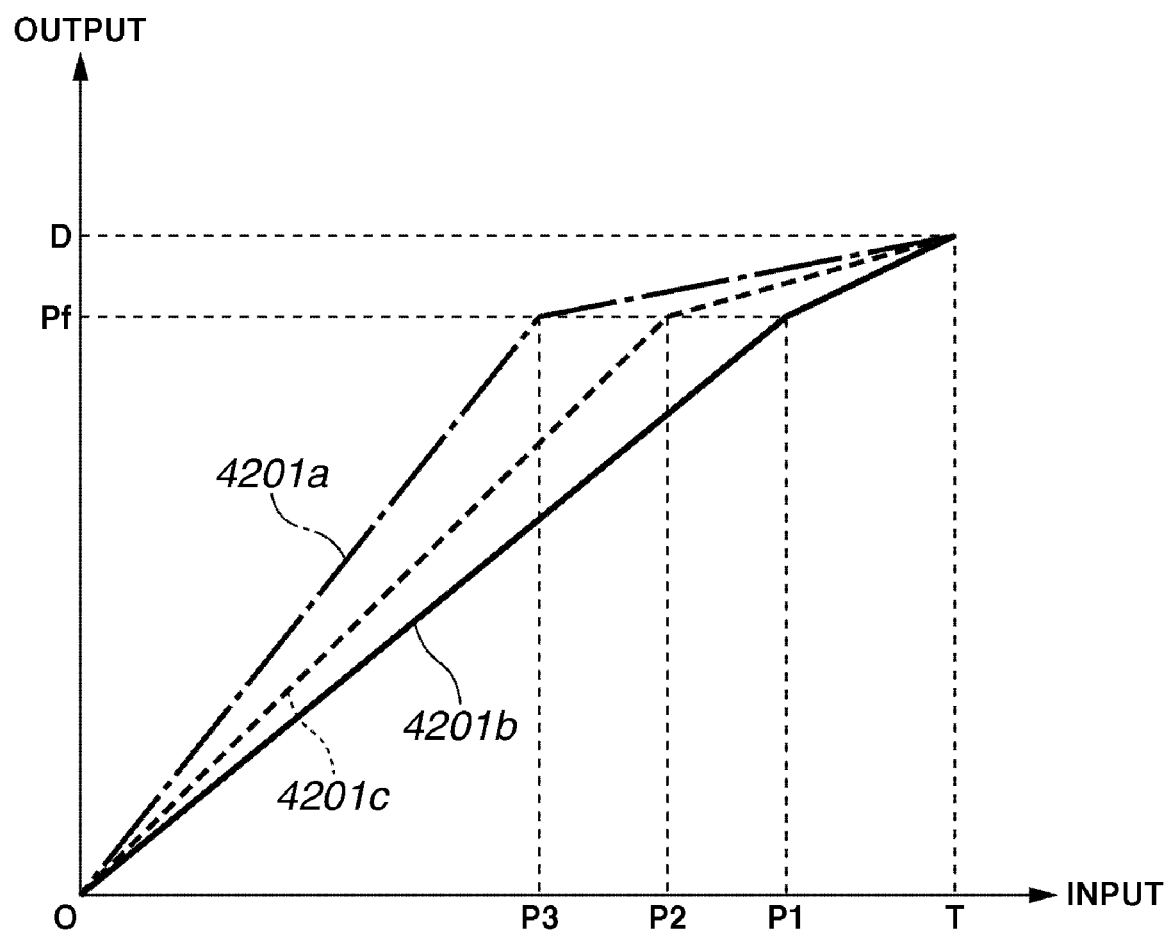
FIG. 26 is a diagram illustrating compression functions used in relation to the selection of the LUT according to the sixth exemplary embodiment of the present invention.

FIG. 26 is a diagram illustrating an input/output response indicating to which point in the output device color space 4103 the point T in the standard color space 4101 and the points P1, P2, and P3 are converted on the line TO shown in FIG. 25.

FIG. 26 shows a conversion definition 4201a used in the case of the positive film original, a conversion definition

4201*b* used in the case of the negative film original, and a conversion definition 4201*c* used in the case of the reflection type original.

When the conversion definition 4201*a* is used, and when a point X' is a compression destination point of the point X in the standard color space 4101, if the point X is determined to be positioned within the input-estimated color gamut 4102*a*, a distance OX' is converted by the above compression function (1.1).

In this case, if the point X is determined to be outside the input-estimated color gamut 4102*a*, the distance OX' is converted by the above compression function (1.2).

Note that in the compression functions, P=P1. Likewise, the conversion definition 4201*b* and the conversion definition 4201*c* describe the conversion definition when P=P2 and P=P3, respectively, in the above compression functions (1.1) and (1.2).

When the input-estimated color gamut of the input device differs as to each type of original, the outer shell point of each color gamut is determined as to each color gamut so as to produce the conversion LUT by letting the point that is determined to be positioned at an outermost position be the boundary point (P) in each of the compression function (1.1) and the compression function (1.2).

Thus, according to this embodiment, the input-estimated color gamut is changed in accordance with the type of original that is the source of input image data.

Thus, regardless of whether various originals of different input-estimated color spaces are used, the LUT can be produced without color collapse and with a good gradation reproducibility of the original.

The LUTs produced in this manner are previously stored in the memory of the MFP 1, and the LUT is selected in accordance with the copy mode that the user specifies.

In addition, by using the LUT for the conversion in step S705 in FIG. 23, an optimum print image in accordance with the type of each original can be obtained without causing the user to be especially aware of the type of the original.

In addition, in the sixth embodiment, the LUT is switched as per each copy mode.

According to the sixth embodiment, as long as the type of the originals is the same, the same color can be reproduced as the same color and the color reproduction can be surely performed without a color collapse.

In this regard, between different copy modes, that is, in the case where the type of the originals differs from each other, if the color of the originals is the same, the color may be reproduced in a different color when copied.

However, the color is not often compared between the types of originals having completely different characteristics such as the negative film and the positive film, and, therefore, this is not an obstacle in the actual use by the user.

Note that in the description of the sixth embodiment, how the type of original to be used is determined in accordance with the setting of the copy mode performed by the user is not described in detail. In this regard, for the method of determining the type of original to be used, a publicly know method may be used. However, it is important that the type of original can be determined in accordance with the copy mode set by using the user interface (UI).

Recently, in the MFP that corresponds to scanning the films, the copying operation generally starts only after the selection among the "negative film", the "positive film", and the "reflection type original" is made by using the UI.

Note that the determination of the type of original is not limited to the above configuration.

In addition, the type of original is classified as the "reflection type original", the "positive film", and the "negative film". However, the configuration is not limited to this. For example, when the "reflection type original" is used, the type of a recording system may be used as a "screen printing", a "silver halide photograph", or an "inkjet" recording system.

In addition, by using the gamut compression according to the sixth embodiment, gradation change characteristics are maintained between an original and a reproduced copy image.

If the gamut compression method is applied to all types of originals with using one unique definition regardless of the type of original, differently from the sixth embodiment, the input-estimated color gamut is defined by setting a maximum gamut for all of the types of originals with respect to all color components.

In this case, a good accuracy is necessary for the color that is not input when a certain original is used. This is a disadvantage when the quality of the copied image is desired to be higher than in the quality achieved in this case.

In this regard, the quality of the copied image can be maintained to be high enough by providing the conversion definition as per each type of original, as described in the sixth embodiment.

In addition, in the above description, the LUT is switched as per each type of original in accordance with the selected copy mode.

In this regard, in the case of the inkjet printer, in general, the color conversion LUT related to the output device unit is dependent on an output mode such as the type of paper used for printing and the quality of printing.

Therefore, as a modification of this embodiment, the configuration may be such that the tables including as the content thereof the type of original and the output mode are provided, and one of the tables is selected in accordance with information obtained by the selection made by using the UI at the time of copying so as to perform a copying operation.

In addition, in the color conversion method according to the sixth embodiment, even when the input-estimated color gamut is changed, the distance OPf that determines the reproduction range does not change. However, the distance OPf may be changed in accordance with the input-estimated color gamut.

That is, depending on how the point Pn (n=1, 2, 3) and the point Pf are set, an effect on the image changes significantly.

Therefore, the point Pn only is changed in accordance with the input-estimated color gamut in the sixth embodiment. However, the configuration may be such that the point Pf only is changed. By changing the value, the effect on the image changes significantly.

In addition, both the points Pf and Pn can be changed at the same time.

Seventh Embodiment

In the seventh embodiment of the present invention, a computation related to the compression or a table of the computation and a basic LUT are used in the processing instead of performing the processing in step S705 in FIG. 23 using the LUT produced in the above-described manner.

That is, in the six embodiment, a table of the conversion definition is produced as per each type of an original, then a LUT is previously provided to the ROM, and then the LUT is selected and used in accordance with the copy mode (the type of an original) selected by the user.

In the seventh embodiment, the same processing is performed using one basic LUT.

Figure 27A:
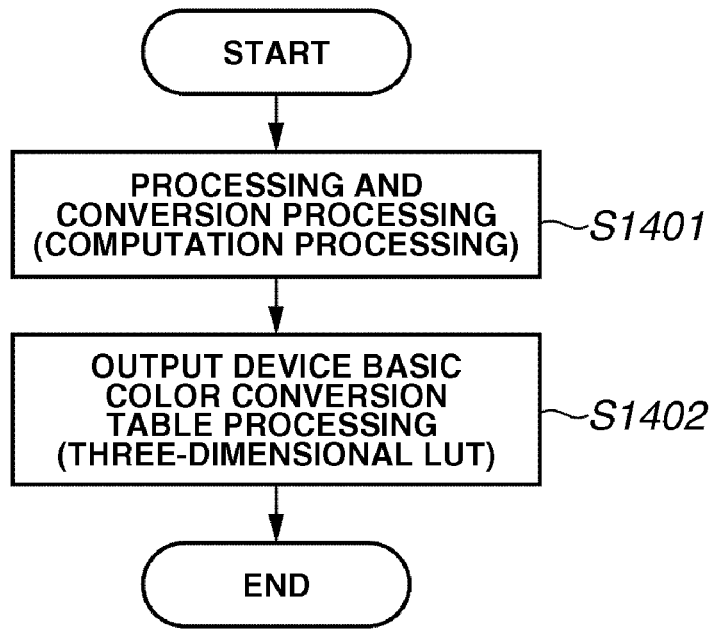
FIG. 27A and FIG. 27B are diagrams illustrating an example of an output device color conversion processing according to a seventh exemplary embodiment of the present invention.
Figure 27B:
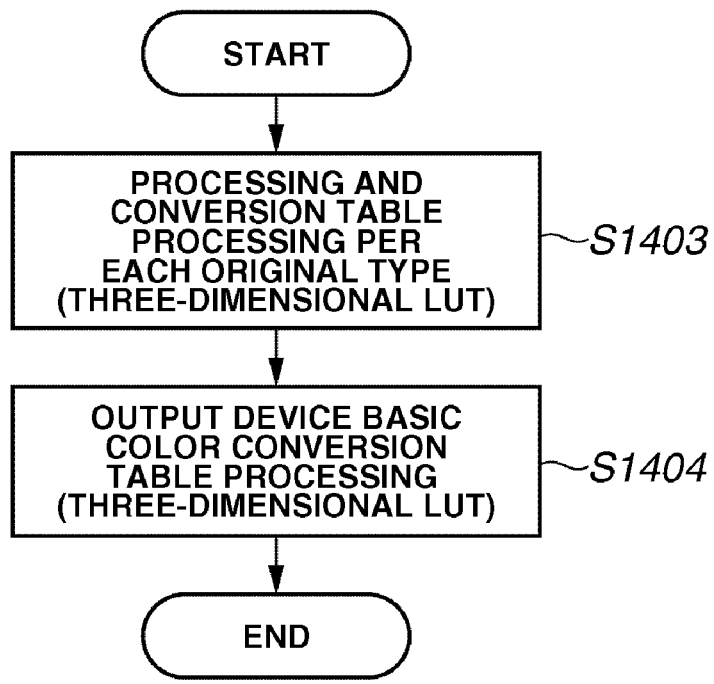

FIG. 27A and FIG. 27B are diagrams each illustrating an example of the output device color conversion processing in step S705 shown in FIG. 23 according to the seventh embodiment.

In the example shown in FIG. 27A, the conversion processing and the image processing in relation to the compression are performed in step S1401, and in step S1402, the basic LUT is referred to in accordance with the result of the computation to obtain the final color conversion result.

The conversion processing and the image processing in step S1401 are basically implemented only by the computation processing.

The computation described below is obtained by turning the conversion processing corresponding to the input/output characteristics into arithmetic expressions. The computation is performed in accordance with the expressions (3.1) and (3.2) below.

Letting an input value be X and an output value be X', where the input point X is X<Pn, $$OX' = (OX \times OPf)/OPn \qquad (3.1), \text{ and}$$

where the input point X is X>Pn, $$OX' = (PX \times PfD)/PnT + OPf \qquad (3.2).$$

Here, n=1, 2, 3, and n is determined in accordance with the type of original.

That is, in the computation in step S1401, referring to FIG. 25, first, on which straight line OT the input value X is positioned in the standard color space 4101 is computed.

Then, the point Pn is computed on the obtained straight line OT in accordance with the type of an original (the mode of the input device).

In addition, the point Pf that is previously determined based on the color gamut 4103 of the printing unit (the print medium used therein) (that is, a certain ratio to D) is computed.

Note that the relationship between the input value X and the straight line OT (and the points Pn and Pf positioned on the straight line OT) can be previously computed by producing a table to compute the points Pn and Pf in accordance with the input value X.

Then, the computation according to the above expression (3.1) or (3.2) is performed, and then the input value X is compressed in accordance with the relationship shown in FIG. 26 based on the type of original so as to obtain the output value X'.

That is, when the original is the positive film original, for example, in FIG. 25, when the input color X exists within the input-estimated color gamut 4102a (X<P3), the output color X' exists within the prioritized color gamut 4104 (X'<Pf).

In addition, when the input color X exists outside the input-estimated color gamut 4102a (X≧P3), the output color X' exists within the printer unit color gamut 4103 and outside the prioritized color gamut 4104 (X'≧Pf).

Then, in step S1402, a final conversion value is computed by using the value X' computed in step S1401 and by referring to the basic LUT that is previously determined in accordance with the color gamut 4103 of the printer unit (the print medium thereof).

The basic LUT is used in the seventh embodiment for linearly converting the color into a color positioned between the points O and D in FIG. 25.

More specifically, the LUT functions to adjust the color reproducibility that differs depending on the type of paper used in the printing unit and the output mode such as the print quality. In this regard, the output characteristic in relation to the input is linear.

The table depends greatly on the content of the color separation processing in step S706 in FIG. 23.

That is, in the color separation processing in step S706, a method of using recording inks is determined. In this regard, the variation characteristic in relation to variance in input signal values of an amount of ink applied onto the paper is designed to be linear.

The design of the variation characteristic is not significant in the seventh embodiment, and, therefore, the description thereof is not made here. However, to describe briefly, this is the method to prevent a pseudo-contour, which is an image deterioration occurring due to granularity of ink dots and a state of arrangement of dots.

On the other hand, when the amount of applied ink linearly increases, the color reproduction characteristic does not always linearly vary.

This occurs due to a way of bleeding of ink on the paper and the color development after the ink is fed onto the paper. It is known that the way of bleeding of ink on the paper and the color development differ depending on the type of paper or the type of ink.

Therefore, when the type of paper or the print quality in printing is changed, the characteristic of the color and the gradation is not necessarily linear in relation to the variance of the input signal value used in the color separation processing in step S706.

The basic LUT that is used in step S1402 serves to adjust the non-linearity and to intermediately adjust the input characteristic of the signal value in step S1402 to be linearly reflected in the color reproduction by the conversion processing to be performed thereafter.

Thus, the computation in step S1401 can be simplified. If there is no basic LUT in step S1402, a complicated computation needs to be performed because the definition considering the characteristic of the color reproduction due to the type of paper and the print quality at the time of printing is determined by the computation processing in step S1401.

If the function for setting the type of paper and the print quality is not provided, the processing in step S1401 using the LUT is not necessary because the result of computation in step S1401 is the same as the output of the LUT produced in the processing in the sixth embodiment.

The example of color conversion shown in FIG. 27B differs from the example shown in FIG. 27A with respect to the processing in step S1403.

In this example, a table of the computation processing in step S1401 is produced as per each type of original (each mode of the input device), and the produced table is used.

There can be a case where the figure of the input-estimated color gamuts 4102a, 4102b, or 4102c or the prioritized color gamut 4104 in FIG. 25 is a complicated figure that is non-linear.

In that case, the characteristic shown in FIG. 26 is likely to be difficult to express by the computation processing because there is a complicated positional relationship among the points Pf, P1, P2, and P3, depending on the orientation of the straight line OT.

In the method shown in FIG. 27B, the LUT is previously produced. The LUT is selected based on the type of original as described below.

Figure 28:
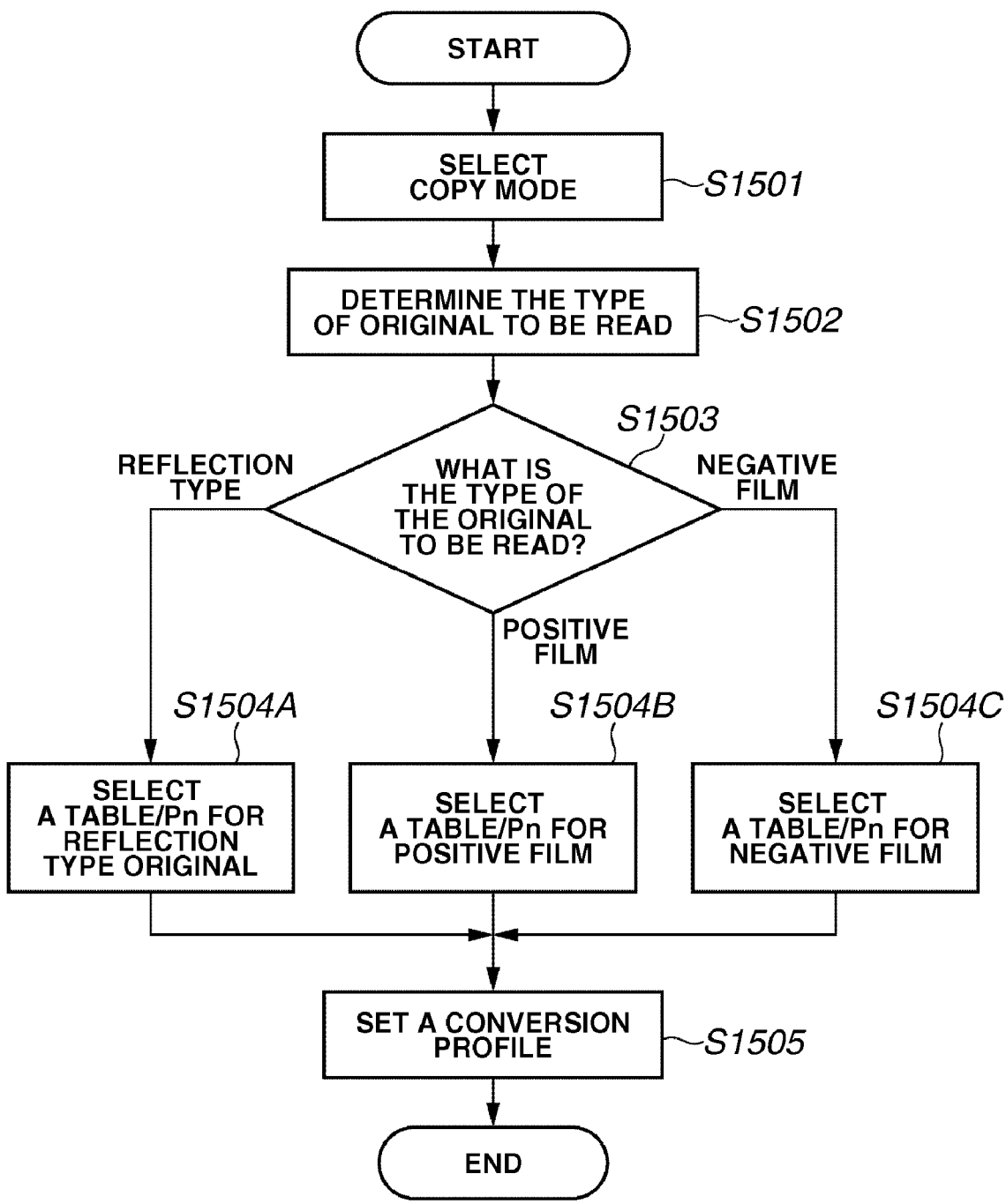
FIG. 28 is a flow chart illustrating a method of selecting a color conversion table according to the seventh exemplary embodiment of the present invention.

FIG. 28 is a flow chart of the processing for setting the conversion profile (LUT) used in performing the color conversion shown in FIG. 27A and FIG. 27B. FIG. 28 shows the processing similar to that shown in FIG. 24.

The difference between FIG. 28 and FIG. 24 is that a processing table (in the case of the example shown in FIG. 27A) or the point Pn (in the case of the example shown in FIG.

27B) is selected in accordance with the type of the read original in step S1504A, S1504B, or S1504C.

The actual value of the point Pn is computed by using the table in accordance with the input value X by the computation processing in step S1401 as described above.

The table used in step S1402 or step S1404 serves to adjust the color reproducibility that differs depending on the output mode such as the type of paper used in the printing unit and the print quality. Here, the characteristic of the color reproduction in relation to the input data is linear.

As a result, if different output modes are used for the computation in step S1401 and the conversion in step S1403, each of the computation in step S1401 and the conversion in step S1403 is the processing performed on a presumption that the characteristic of the output device is linear.

The conversion definition used in the conversion does not depend on the output mode.

Thus, with respect to the LUT used for converting the standard color space into the color gamut of the output device, the LUT that is different as per each input-estimated color gamut that differs in accordance with the type of an original is used. Therefore, the number of tables can be reduced even when the input modes for different types of originals increase.

Thus, a necessary capacity of the memory such as a ROM can be reduced to contribute to reducing the costs of manufacture.

Note that the basic LUT used in steps S1402 and S1404 is described as the LUT used for the conversion in which the color reproduction characteristic is linear in relation to the input data. However, the configuration is not limited to this. That is, even if the color reproduction characteristic is not linear in relation to the input data, and as long as the characteristic does not differ so much between the output modes, the LUT may be designed with a consideration on the characteristic in the computation processing in step S1401 and in producing the LUT used in step S1403.

In addition, there is a case where the difference in the color reproduction characteristic between the output modes is great when the type of paper used in the printing unit is the photograph paper and the plain paper.

In this case, the configuration may be such that the output characteristics are categorized, then the computation in step S1401 is performed as per each categorized characteristic, and sets of LUTs used in step S1403 are provided in the same number as the number of the categories.

In this case, the number of LUTs can be smaller than the number of LUTs provided in the sixth embodiment.

In addition, the processing as illustrated in each of FIG. 27A and FIG. 27B is described as the example that is implemented in the image processing for producing print data. However, the configuration is not limited to this.

For example, the configuration may be such that the LUT that is subjected to the processing is produced within the device before printing and the resulting LUT is used in the conversion processing in step S705 in FIG. 23.

Eighth Embodiment

The eighth embodiment is directed to a method of compression.

In the method of compression such that the standard color space is compressed to the output device color gamut with maintaining an even gradation, the gradation reproducibility is good. However, a calorimetric difference occurs with respect to all the colors. Thus, the color reproduction differs as per each output device.

Meanwhile, the gamut compression method for implementing calorimetric matching is known. However, when this method is used, the color collapse occurs with respect to all the colors outside the printer color gamut, and sometimes the color is not reproduced well.

In this regard, in the eighth embodiment, a color gamut in which the color reproduction that is calorimetrically approximated is performed (hereinafter referred to as a "colorimetrically matching color gamut") is provided within the output device color gamut.

In addition, the color within the calorimetrically matching color gamut among the colors within the standard color space is reproduced so that the color is calorimetrically approximated. The color outside the colorimetrically matching color gamut is compressed to the output device color gamut (in this embodiment, the printer color gamut) lying outside an outer shell of the calorimetrically matching color gamut.

Thus, for different types of output devices, the color within the calorimetrically matching color gamut can be compressed to the color that is calorimetrically approximated. In addition, all the colors outside the calorimetrically matching color gamut can be compressed with securing a good color reproduction without the collapse in the gradation.

Figure 29:
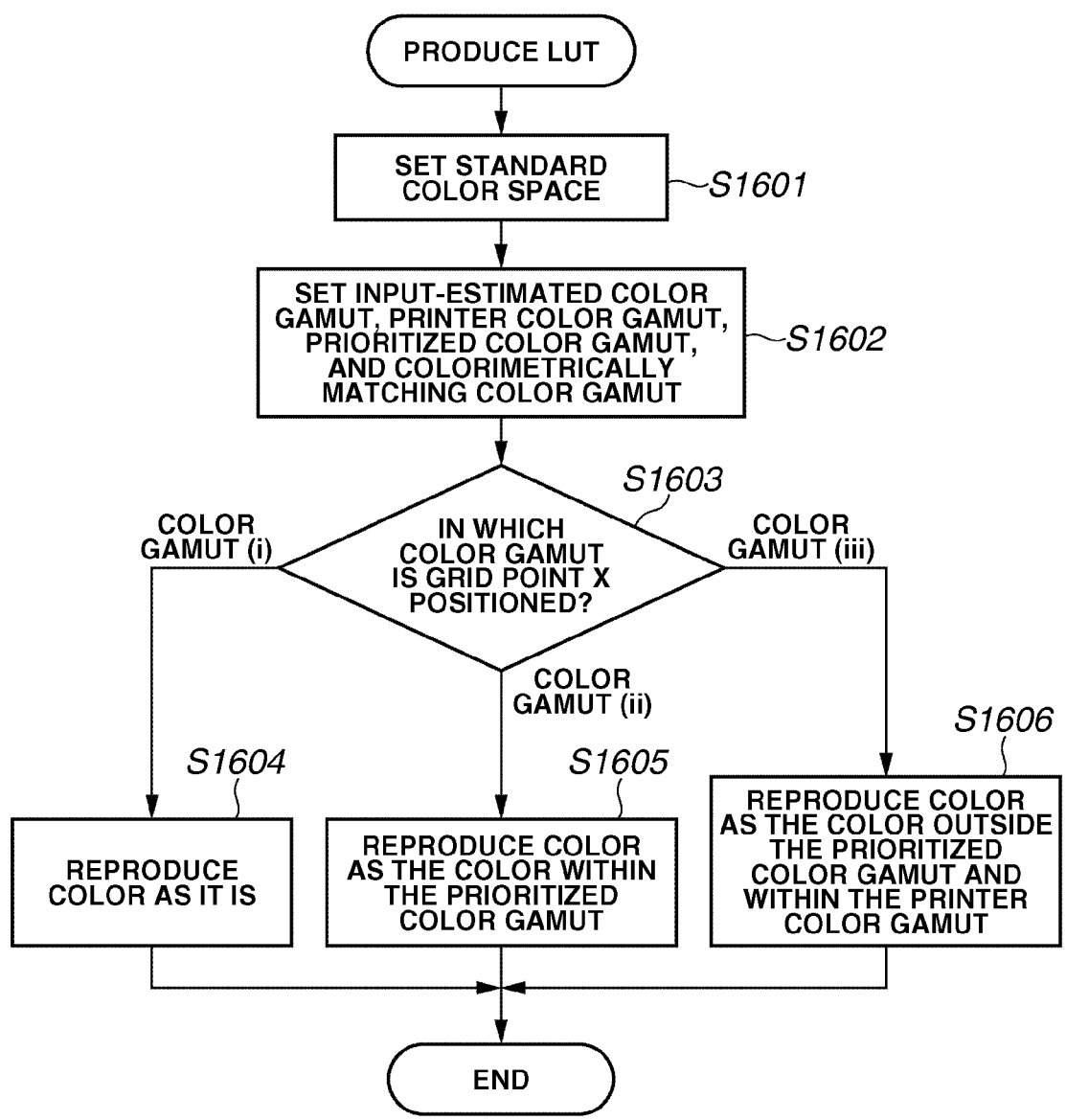
FIG. 29 is a flow chart of a processing for producing the LUT according to an eighth exemplary embodiment of the present invention.

FIG. 29 is a flow chart illustrating processing for producing the LUT according to the eighth embodiment.

Figure 30:
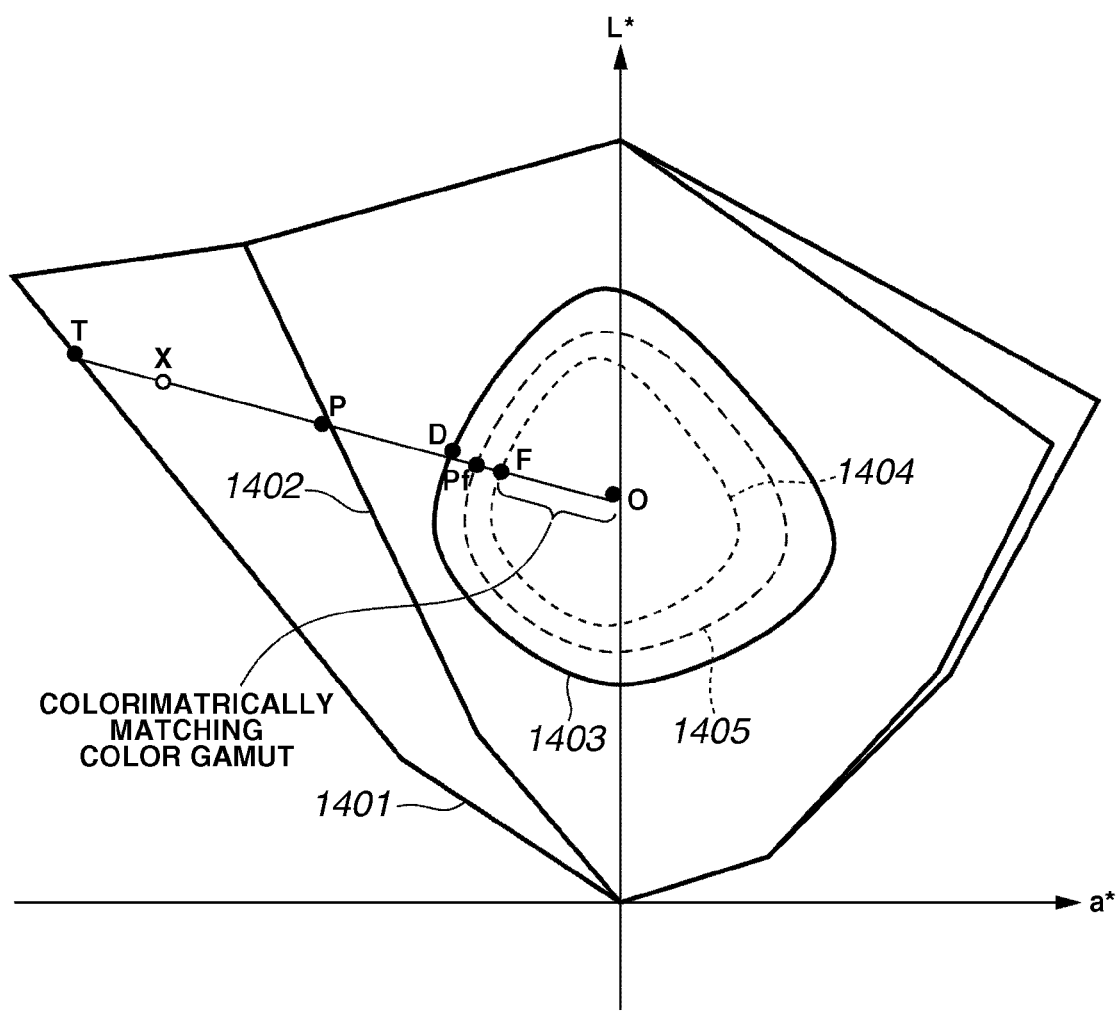
FIG. 30 is a diagram illustrating a standard color space, an input-estimated color gamut, a printer color gamut, and a calorimetrically matching color gamut, which are defined by the LUT.

In addition, FIG. 30 is a diagram illustrating a standard color space 1401, an input-estimated color gamut 1402, an inkjet printer color gamut 1403, a prioritized color gamut 1405, and a calorimetrically matching color gamut 1404, which are defined by the LUT.

Referring to FIG. 30, a point F is positioned on the boundary of the calorimetrically matching color gamut 1404 on a straight line that extends from a compression destination point O to a compression target grid point X, and the distance between the point O and the point F is taken as a distance OF. Other points are the same as the points as illustrated in FIG. 7 according to the first embodiment described above.

In the eighth embodiment, the calorimetrically matching color gamut 1404 is a color gamut having a figure similar to the printer color gamut 1403 and a volume of about sixty percent of the volume of the printer color gamut 1403. Here, the calorimetrically matching color gamut 1404 has a similar figure as the printer color gamut 1403. However, the calorimetrically matching color gamut 1404 does not need to be the similar figure as the printer color gamut 1403.

Referring to FIG. 29, the standard color space 1401 is set in step S1601. In step S1602, the input-estimated color gamut 1402, the printer color gamut 1403, the prioritized color gamut 1405, and the calorimetrically matching color gamut 1404 are set.

An exemplary method of setting each color gamut is similar to that described in the first embodiment.

In step S1603, it is determined in which color gamut the compression target grid point X is positioned with respect to each color gamut that is set as described above. More specifically, in which of color gamuts (i) through (iii) the compression target grid point X is positioned is determined as follows:

(i) Within the colorimetrically matching color gamut 1404;

(ii) Outside the calorimetrically matching color gamut 1404 and within the input-estimated color gamut 1402;

(iii) Outside the input-estimated color gamut 1402 and within the standard color space 1401.

When it is determined that the point X is positioned in the color gamut (i), then in step S1604, the color is compressed in accordance with a compression function (4.1) as described below. That is, a mapping is performed so that the input color is faithfully reproduced.

$$OX'=OX \quad (4.1)$$

When it is determined that the point X is positioned within the color gamut (ii), then in step S1605, the color is compressed in accordance with a compression function (4.2) described below.

$$OX'=OF+(FX\times FPf)/FP \quad (4.2)$$

When it is determined that the point X is positioned within the color gamut (iii), then in step S1606, the color is compressed in accordance with a compression function (4.3) described below.

$$OX'=OPf+(PX\times PfD)/PT \quad (4.3)$$

When a compression destination point X' is determined as described above, the RGB values thereof are determined to be data of a gamut mapping destination of the grid point X, and the RGB values are stored as output values in relation to the grid point X.

Figure 31:
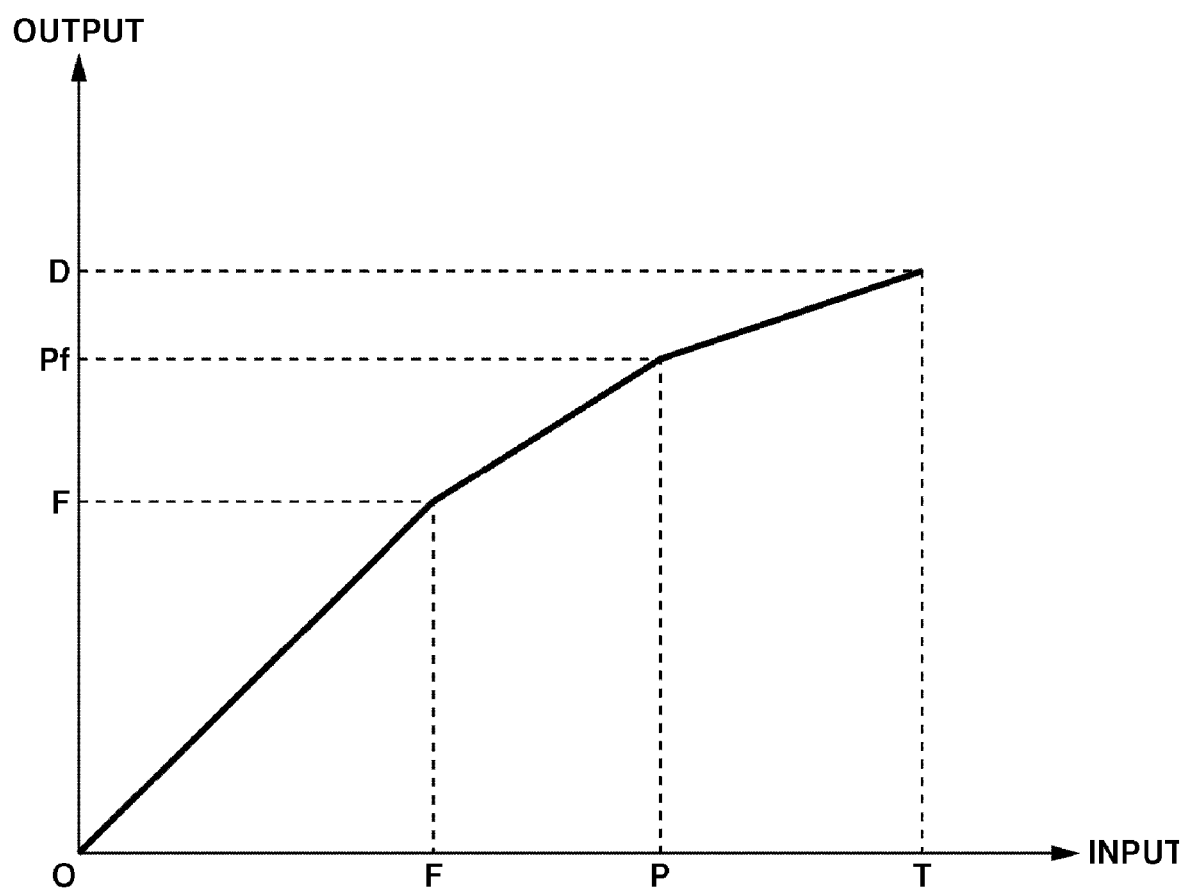
FIG. 31 is a diagram illustrating compression functions that are used in the eighth exemplary embodiment of the present invention.

FIG. 31 is a diagram illustrating the compression functions (4.1), (4.2), and (4.3) described above.

As is clear from FIG. 31, among the colors in the standard color space 1401, the color in the color gamut (i) is faithfully reproduced as it is, and the color within the color gamut (ii) is reproduced as the color outside the calorimetrically matching color gamut 1404 and within the prioritized color gamut 1405.

In addition, the color in the color gamut (iii) is compressed to be the color within the printer color gamut 1403.

In this manner, in the eighth embodiment, the calorimetrically matching color gamut 1404 is especially provided, and thus the calorimetrically matching compression of the color within the calorimetrically matching color gamut 1404 is implemented. In addition, no color collapse occurs with respect to the color outside the calorimetrically matching color gamut 1404 due to the compression.

Note that in each embodiment as described above, the compression function is the function using a one-dimensional straight line. However, the compression function is not limited to this. That is, a quadric or an exponential function can be used.

In addition, in each embodiment as described above, the method of compression performed toward one compression destination point is described. However, the method of compression is not limited to that gamut compression method.

For example, a compression method by which compression is performed toward an achromatic axis with maintaining the lightness and a compression by which no reversal of saturation occurs, which is described in detail later below, can be implemented.

In the compression method according to the sixth embodiment, an amount of features of the input-estimated color gamut is equivalent to the point P1, P2, or P3 shown in FIG. 26.

On the other hand, in the compression method according to the eighth embodiment, the amount of features that needs to be changed as per each input-estimated color gamut is either one of or both of the points F and P shown in FIG. 31 or the compression function used in the computation described above.

The amount of features is changed because the amount of features is the factor for greatly improving the features of the image from the features of the image in the case where the publicly known gamut mapping technology is used. In addition, the amount of features is changed because the amount of features is the amount of features that is characteristic to the eighth embodiment.

In producing the LUT for directly converting the standard color space to the output device color gamut as in the case of the sixth embodiment, when the amount of features is used, the same effect as the eighth embodiment can be implemented.

In addition, in the conversion processing and the image processing in step S1401 itself and in producing the table used in step S1403, if the features are reflected, the same effect as the eighth embodiment can of course be implemented.

By performing the above control, an optimum color conversion can be performed for each type of original to be input while achieving a good gradation and the color matching. Thus, the quality of the copied image can be high.

In addition, the compression method according to the eighth embodiment is described as the same example as in the first embodiment. However, the compression method according to the eighth embodiment can be applied to the second embodiment.

Ninth Embodiment

The ninth embodiment is directed to the color gamut conversion in accordance with the type of image data input to the MFP.

The MFP is provided with various functions for inputting image data in addition to the copying function described in the sixth embodiment.

In addition, the MFP has a camera direct print function by which image data is obtained from a digital camera via a USB cable to print the input image data.

In addition, the MFP has a card slot direct print function for obtaining image data stored in a memory card via a memory card slot and for printing the obtained image data.

In addition, the MFP has a wireless direct print function for obtaining image data from a personal digital assistant (PDA) through infrared communication.

The MFP performs the color conversion of the input image via different data interfaces (I/F) described above and prints out the image by the printing unit.

The color reproduction range of the image data input by the device connected via the different I/Fs differs depending on the I/F.

In the ninth embodiment, the color gamut is appropriately converted when the color reproduction range differs as to each connection device.

Figure 32:
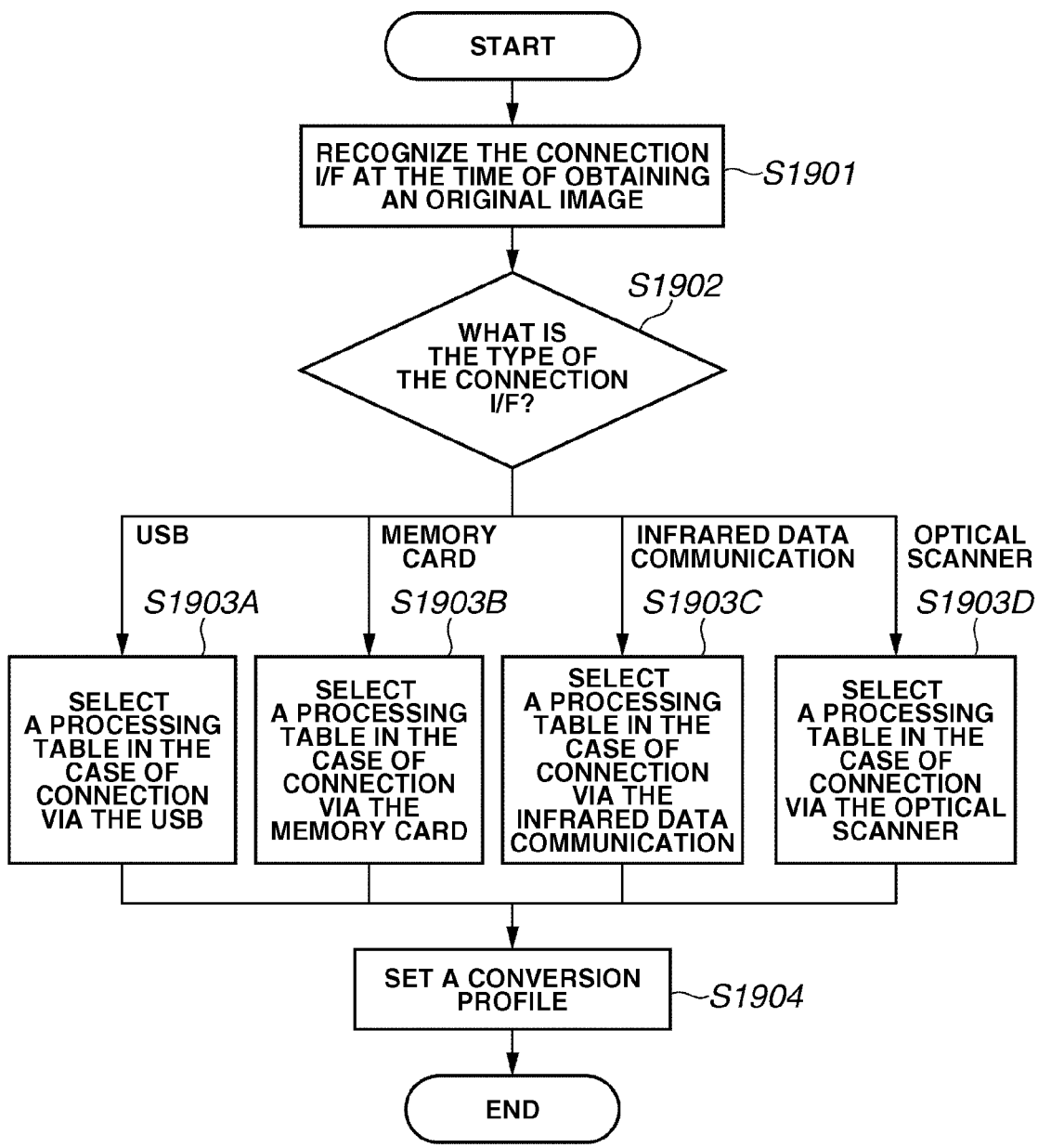
FIG. 32 is a flow chart illustrating a method of selecting the color conversion table according to a ninth exemplary embodiment of the present invention.

FIG. 32 is a flow chart of exemplary processing for setting the conversion profile according to the ninth embodiment.

In step S1901, the type of connection I/F is obtained. In step S1902, the obtained type of connection I/F is determined.

Then, in any one of steps S1903A through S1903D, the conversion profile (three-dimensional LUT) is selected in accordance with the type of connection I/F determined in step S1902.

In step S1903A, the LUT in the case where the USB I/F is connected is selected. Likewise, in step S1903B, the LUT corresponding to the memory card I/F is selected. In step S1903C, the LUT corresponding to the I/F for the infrared communication is selected. In step S1903D, the LUT corresponding to the scanner I/F is selected.

Finally, in step S1904, the profile (LUT) that is selected in any one of steps S1903A through S1903D is set to a given memory in order to use the profile in the output device color conversion processing to be described below.

The LUT that is set here is produced in a similar manner as described in the first embodiment or the third embodiment.

Here, in some cases, the device connected to the MFP differs as to each input I/F and an image forming method in each such case differs, and thus the input-estimated color gamut differs as to each I/F.

For example, when the data is obtained through the USB, the digital camera is the device of the target of connection. Thus, sYCC that is a color space in the case of photographing by the digital camera is the input-estimated color gamut.

On the other hand, in the case of the infrared communication I/F, the PDA is used. Thus, sRGB is generally the input-estimated color gamut as in the case where the PC is used.

In addition, when the data is obtained via the optical scanner, the color reproduction range depending on the type of original (for example, the reflection type print original) is the input-estimated color gamut.

Thus, when there are various input-estimated color gamuts, the color gamut conversion that is appropriate for each case is as described in each of the embodiments above.

Figure 33:
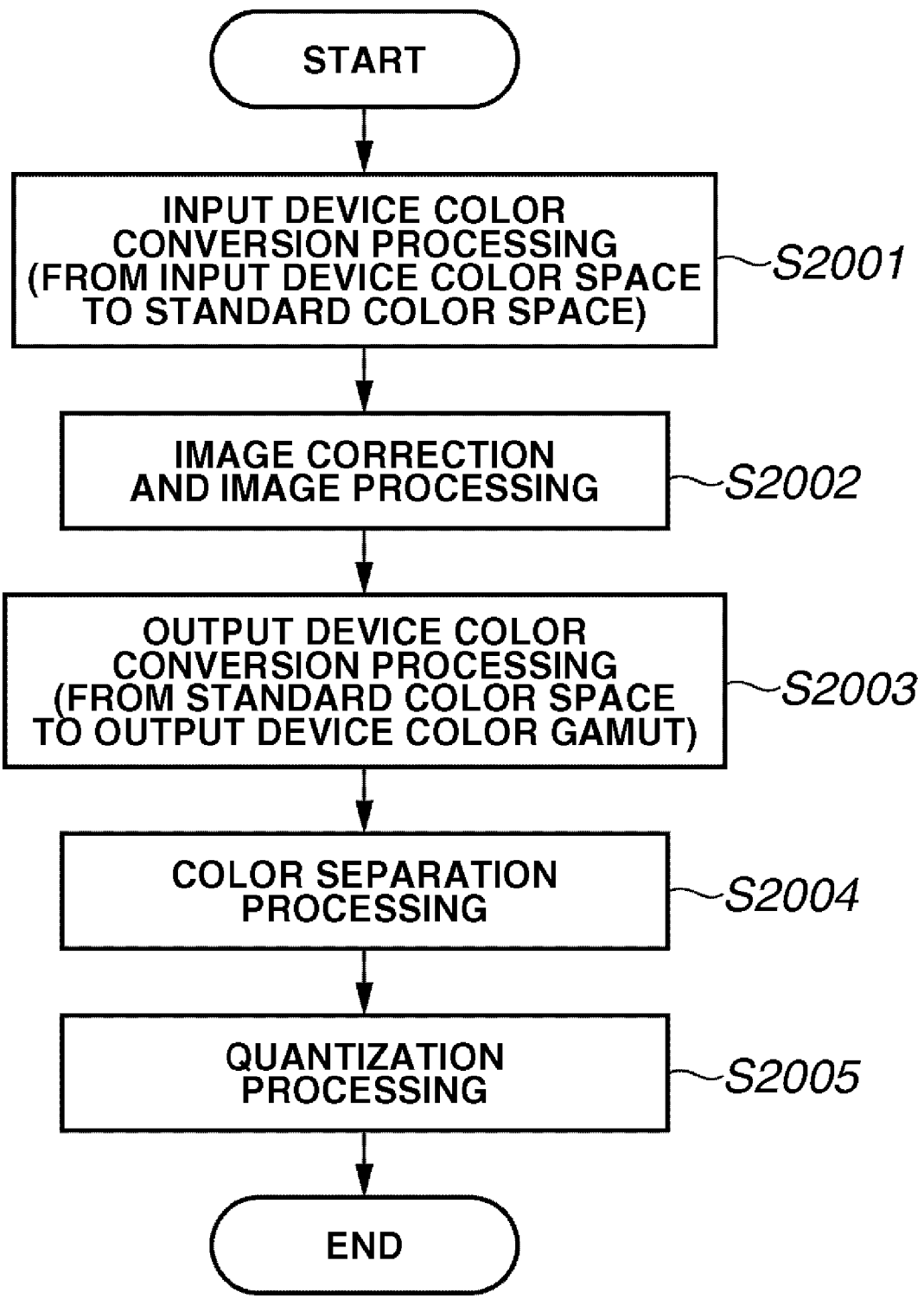
FIG. 33 is a flow chart of an image processing according to the ninth exemplary embodiment of the present invention.

FIG. 33 is a flow chart of the image processing implemented after the profile is set as described above.

In step S2001, the color conversion processing from the input data to the standard color space is performed. The processing performed here differs depending on the type of I/F.

For example, when the connection I/F is the USB, the data photographing by the digital camera is a JPEG file of YCC format, and the photographed data is converted to the standard color space. In addition, when the connection I/F is the optical scanner I/F, the processing in steps S701 and S702 shown in FIG. 23 is performed.

In step S2002, the correction processing and image processing are performed on the image. In step S2003, by using the LUT that is set by the processing shown in FIG. 32, the conversion from the standard color space to the output device color gamut is performed.

Next, in step S2004, the color separation processing for producing color material data in the printing unit is performed. Then, in step S2005, quantization processing is performed, and then the print data is sent to the printing unit.

As described above, according to the ninth embodiment, the LUT that is used for output device color conversion can be determined in accordance with which I/F the image data is obtained.

Thus, an optimum color conversion definition can be automatically provided even when the input-estimated color gamut differs for each I/F if no selection is made by using the user interface (UI) to obtain a high-quality output image.

In the ninth embodiment, the example in which the color conversion is performed by selecting a different LUT is for each of the I/Fs. However, the configuration is not limited to this. For example, in the case of the camera direct print and the card direct print, even if the I/F in each case differs from each other, the original input data is the image photographed by the digital camera in both cases, and thus the input-estimated color gamut is the same in both cases.

Thus, when the input-estimated color gamut is handled as the same even if the I/F differs, the same conversion definition can be used.

In addition, in the description of the processing shown in FIG. 32, the example in which one type of input is performed from the scanner is described. However, the configuration may be such that the LUT is determined in accordance with another type of original such as the film, by segmentizing the type of the input, as in the first embodiment.

As is clear from the previous embodiments, there is a case where different input-estimated color gamuts are determined in the case where the input data is sent via the same I/F, depending on the mode selection made through the UI.

In this case, the LUT to be used may be changed based on both the result of the automatic determination in accordance with the I/F and the result of the mode selection made through the UI.

Tenth Embodiment

In each of the above embodiments, the present invention is applied to the color gamut conversion processing by the MFP.

However, the application of the present invention is not limited to this, and the present invention can be applied to other apparatuses.

In the tenth embodiment, the output device color conversion processing differs in accordance with the type of image input device that is connected to a digital television set.

FIG. 34 is a flow chart of the processing for setting the conversion profile in the digital television set according to the tenth embodiment of the present invention.

The processing according to the tenth embodiment is basically the same as the profile setting processing by the MFP as described in each of the above embodiments.

First, in step S2101, the type of input device that is connected to the digital television set is obtained. In step S2102, the obtained type of input device is determined.

Then, in any one of steps S2103A through S2103E, the conversion profile (three-dimensional LUT) is selected in accordance with the type of input device determined in step S2102.

In step S2103A, the LUT corresponding to signals from an analog antenna is selected. In step S2103B, the LUT corresponding to signals from a digital antenna is selected. In step S2103C, the LUT corresponding to signals from a video recorder is selected. In step S2103D, the LUT corresponding to web data signals sent via the Internet is selected. In step S2103E, the LUT corresponding to signals from a digital video camera sent via the USB I/F of the television set is selected.

Then, in step S2104, the three-dimensional LUT that is selected in either one of steps S2103A through S2103E is set as the profile for the color gamut conversion from the standard color space to the color reproduction range of an output screen of the digital television set.

The LUT that is selected in the above processing can be produced by the method described in the sixth embodiment or the eighth embodiment.

Thus, even if the output device is a digital television set, the present invention can be applied to form an optimum output image.

In the sixth to tenth embodiments, the method of gamut mapping according to the third to fifth embodiment can be used.

According to the sixth to tenth embodiments as described above, even if various types of originals are used and thus the color reproduction range of the input device varies, the color within the input-estimated color gamut can be reproduced well, and the color outside the input-estimated color gamut can be surely reproduced.

Other Embodiments

An aspect of the present invention can also be achieved so that each type of device operates so as to implement the functions of the embodiments above, by providing a computer (a CPU or a micro-processing unit (MPU)) within an apparatus or a system that is connected to each type of device with program code of software implementing the functions of the first to tenth embodiments and by reading and executing the program code stored in the computer of the system or the apparatus.

In this case, the program code itself implements the functions of the embodiments described above, and the program code itself is supplied to the computer on a medium. For example, the storage medium for supplying such program code may be a flexible disk, a hard disk, an optical disk, a magneto-optical disk, a compact disk-ROM (CD-ROM), a magnetic tape, a nonvolatile memory card, or a ROM.

In addition, the functions according to the embodiments described above are implemented not only by executing the program code read by the computer, but can also be implemented by the processing in which an OS (operating system) or a combination of the OS and other application software carries out a part of or the whole of the actual processing on based on the instructions given by the program code.

Further, in another aspect of the present invention, after the supplied program code is written in memory provided in a function expansion board inserted in the computer or a function expansion unit connected to the computer, a CPU and the like provided in the function expansion board or the function expansion unit carries out a part of or the whole of the processing to implement the functions of the embodiments as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-234786 filed Aug. 12, 2005 and No. 2006-153554 filed Jun. 1, 2006, which are hereby incorporated by reference herein in their entirety.

What is claimed is:

1. An image processing method for converting color values within a first color reproduction range that is a device-independent color space into color values within a second color reproduction range that is a color reproduction range of an output device, the method comprising:
    defining, within the first color reproduction range, a third color reproduction range being different from the first color reproduction range and corresponding to a color reproduction range of color values that are estimated to be input for color values generated from an image generation device;
    defining, within the second color reproduction range, a fourth color reproduction range that is smaller than the second color reproduction range, wherein the fourth color reproduction range is defined so as to include a position corresponding to 80% of a distance from a luminance axis of the device-independent color space to an outer most shell of the second color reproduction range; and
    converting, utilizing a processor, color values within the first color reproduction range into color values within the second color reproduction range by compressing color values within the third color reproduction range into color values within the fourth color reproduction range and compressing color values within the first color reproduction range and outside the third color reproduction range into color values within the second color reproduction range and outside the fourth color reproduction range,
    wherein a method of compressing color values within the third color reproduction range is different from a method of compressing color values within the first color reproduction range and outside the third color reproduction range.

2. The image processing method according to claim 1, further comprising defining, within the second color reproduction range, a fifth color reproduction range that is a color reproduction range for performing a colorimetrically matching color reproduction and is smaller than the fourth color reproduction range,
    wherein converting color values within the first color reproduction range into color values within the second color reproduction range includes converting color values within the fifth color reproduction range such that the color values are colorimetrically approximated and compressing color values within the third color reproduction range into color values outside the fifth color reproduction range and within the fourth color reproduction range.

3. The image processing method according to claim 1, further comprising defining the fourth color reproduction range in accordance with a size of the second color reproduction range.

4. The image processing method according to claim 1, further comprising defining the fourth color reproduction range in accordance with a ratio computed based on a distance from a compression convergence point to an intersecting point between a straight line that extends from the compression convergence point to a compression target point in the first color reproduction range and an outermost shell of the second color reproduction range.

5. The image processing method according to claim 4, wherein the ratio can be changed for each hue.

6. The image processing method according to claim 1, wherein at least a part of a shape of the fourth color reproduction range is similar to a shape of the second color reproduction range.

7. The image processing method according to claim 1, further comprising:
    determining a type of data source for input data; and
    changing at least one of the third color reproduction range, the fourth color reproduction range, and conversion characteristics in the compression, in accordance with the type of data source.

8. The image processing method according to claim 7, further comprising selecting and setting a lookup table that corresponds to the type of data source,
    wherein compression is performed using the lookup table.

9. The image processing method according to claim 7, further comprising changing the third color reproduction range in accordance with the type of data source.

10. The image processing method according to claim 7, further comprising setting a type of processing,
    wherein determining the type of data source for input data includes determining the type of data source in accordance with a result of setting the type of processing.

11. An image processing apparatus configured to convert color values within a first color reproduction range that is within a device-independent color space into color values within a second color reproduction range that is a color reproduction range of an output device, the image processing apparatus comprising:

a compression unit configured to, in converting color values within the first color reproduction range into color values within the second color reproduction range, compress color values within a third color reproduction range into color values within a fourth color reproduction range and compress color values within the first color reproduction range and outside the third color reproduction range into color values within the second color reproduction range and outside the fourth color reproduction range, wherein the third color reproduction range, within the first color reproduction range, is different from the first color reproduction range and corresponds to a color reproduction range of color values that are estimated to be input for color values generated from an image generation device, wherein the fourth color reproduction range, within the second color reproduction range, is smaller than the second color reproduction range, wherein the fourth color reproduction range includes a position corresponding to 80% of a distance from a luminance axis of the device-independent color space to an outer most shell of the second color reproduction range, and wherein a method used by the compression unit to compress color values within the third color reproduction range is different from a method used by the compression unit to compress color values within the first color reproduction range and outside the third color reproduction range.

12. An image processing apparatus according to claim 11, wherein the third color reproduction range is an sRGB color space.

13. An image processing apparatus according to claim 11, wherein the color values within the first color reproduction range correspond to image data input from an image scanner.

14. A non-transitory computer-readable medium having a program embedded therein for causing a computer to perform an image processing method for converting color values within a first color reproduction range that is a device-independent color space into color values within a second color reproduction range that is a color reproduction range of an output device, the program comprising:

computer-readable instructions for, in converting color values within the first color reproduction range into color values within the second color reproduction range, compressing color values within a third color reproduction range into color values within a fourth color reproduction range and compressing color values within the first color reproduction range and outside the third color reproduction range into color values within the second color reproduction range and outside the fourth color reproduction range, wherein the third color reproduction range, within the first color reproduction range, is different from the first color reproduction range and corresponds to a color reproduction range of color values that are estimated to be input for color values generated from an image generation device, wherein the fourth color reproduction range, within the second color reproduction range, is smaller than the second color reproduction range, and wherein the fourth color reproduction range includes a position corresponding to 80% of a distance from a luminance axis of the device-independent color space to an outer most shell of the second color reproduction range, and wherein a method of compressing color values within the third color reproduction range is different from a method of compressing color values within the first color reproduction range and outside the third color reproduction range.

15. An image processing method for converting color values within a first color reproduction range that is a device-independent color space into color values within a second color reproduction range that is a color reproduction range of an output device, the method comprising:

defining, within the first color reproduction range, a third color reproduction range being different from the first color reproduction range and corresponding to a color reproduction range of color values that are estimated to be input for color values generated from an image generation device;

defining, within the second color reproduction range, a fourth color reproduction range that is smaller than the second color reproduction range, wherein the fourth color reproduction range is defined so as to include a position corresponding to 80% of a distance from a luminance axis of the device-independent color space to an outer most shell of the second color reproduction range; and converting, using a processor, color values within the first color reproduction range into color values within the second color reproduction range by compressing color values within the third color reproduction range into color values within the fourth color reproduction range and compressing color values within the first color reproduction range and outside the third color reproduction range into color values within the second color reproduction range and outside the fourth color reproduction range, such that color values into which color values within the third color reproduction range are converted differs in gradation from color values into which a color outside the third color reproduction range is converted, wherein a method of compressing color values within the third color reproduction range is different from a method of compressing color values within the first color reproduction range and outside the third color reproduction range.

16. The image processing method according to claim 15, wherein the gradation of color values into which color values within the third color reproduction range are converted is lower than that of color values into which color values outside the third color reproduction range is converted.

* * * * *